United States Patent
Jung et al.

(10) Patent No.: US 10,075,379 B2
(45) Date of Patent: Sep. 11, 2018

(54) DEVICE AND METHOD FOR TRANSMITTING/RECEIVING DATA IN WIRELESS COMMUNICATION SYSTEM

(71) Applicant: Samsung Electronics Co., Ltd, Gyeonggi-do (KR)

(72) Inventors: Hakyung Jung, Seoul (KR); Beomsik Bae, Gyeonggi-do (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 85 days.

(21) Appl. No.: 15/235,060

(22) Filed: Aug. 11, 2016

(65) Prior Publication Data

US 2017/0048151 A1    Feb. 16, 2017

(30) Foreign Application Priority Data

Aug. 11, 2015    (KR) .................... 10-2015-0113163

(51) Int. Cl.
| | |
|---|---|
| *H04W 4/00* | (2018.01) |
| *H04L 12/801* | (2013.01) |
| *H04L 29/06* | (2006.01) |
| *H04L 12/721* | (2013.01) |
| *H04W 36/00* | (2009.01) |
| *H04W 88/06* | (2009.01) |
| *H04W 36/14* | (2009.01) |
| *H04W 80/06* | (2009.01) |

(52) U.S. Cl.
CPC ............ *H04L 47/193* (2013.01); *H04L 45/72* (2013.01); *H04L 69/16* (2013.01); *H04W 36/0044* (2013.01); *H04W 36/14* (2013.01); *H04W 80/06* (2013.01); *H04W 88/06* (2013.01)

(58) Field of Classification Search
CPC ....... H04L 45/72; H04L 47/193; H04L 69/16; H04W 36/0044; H04W 36/14; H04W 80/06; H04W 88/06
See application file for complete search history.

(56) References Cited

U.S. PATENT DOCUMENTS

| | | | |
|---|---|---|---|
| 8,681,742 B2 | 3/2014 | Sun et al. | |
| 2005/0068894 A1* | 3/2005 | Yu | H04L 29/06 370/235 |
| 2006/0182025 A1 | 8/2006 | Kim et al. | |
| 2007/0280273 A1* | 12/2007 | Yun | H04W 80/06 370/401 |

* cited by examiner

*Primary Examiner* — Minh-Trang Nguyen

(57) ABSTRACT

The present disclosure relates to a 5G or pre-5G communication system to be provided in order to support a higher data transmission rate than a 4G communication system such as LTE. The present disclosure relates to a device and method for transmitting and/or receiving data in a wireless communication system. The present disclosure enables determining whether an access change occurs from a first node using a first Radio Access Technology (RAT) to a second node using a second RAT and enables transmitting information instructing to adjust the TCP transmission rate to a TCP transmission device when an access change occurs from the first node to the second node.

16 Claims, 17 Drawing Sheets

120

DEVICE AND METHOD FOR TRANSMITTING/RECEIVING DATA IN WIRELESS COMMUNICATION SYSTEM

CROSS-REFERENCE TO RELATED APPLICATION(S) AND CLAIM OF PRIORITY

The present application is related to and claims the benefit of priority under 35 U.S.C. § 119(a) to Korean Application Serial No. 10-2015-0113163, which was filed in the Korean Intellectual Property Office on Aug. 11, 2015, the entire content of which is hereby incorporated by reference.

TECHNICAL FIELD

The present disclosure relates to a device and method for transmitting/receiving data in a wireless communication system.

BACKGROUND

In order to meet wireless data traffic demands that have increased after system commercialization, efforts to develop an improved 5G communication system or a pre-5G communication system have been made. For this reason, the 5G communication system or the pre-5G communication system is called a beyond 4G network communication system or a post LTE system.

In order to achieve a high data transmission rate, implementation of the 5G communication system in a millimeter wave (mmWave) band (such as, 60 GHz band) is considered. In order to reduce, in an ultra-high frequency band, the path loss of an electric wave and increase the transmission distance of an electric wave, technologies such as a beamforming, a massive MIMO, a Full Dimensional MIMO (FD-MIMO), an array antenna, an analog beamforming, and a large scale antenna has been discussed for the 5G communication system.

Further, technologies such as an evolved small cell, an advanced small cell, a cloud Radio Access Network (cloud RAN), an ultra-dense network, Device to Device communication (D2D), a wireless backhaul, a moving network, cooperative communication, Coordinated Multi-Points (CoMP), and interference cancellation to improve the system network have been developed for the 5G communication system.

In addition, the 5G system has developed Advanced Coding Modulation (ACM) schemes such as Hybrid FSK and QAM Modulation (FQAM) and Sliding Window Superposition Coding (SWSC), and advanced access technologies such as Filter Bank Multi Carrier (FBMC), Non Orthogonal Multiple Access (NOMA), and Sparse Code Multiple Access (SCMA).

In the above-mentioned 5G communication system, when a Wireless Access Point is changed according to the movement of a user, a Radio Access Technology (RAT) used in the access point may be frequently changed. A bandwidth provided to a User Equipment (UE) may be greatly changed according to such a change of the RAT. For example, let us assume a communication system including a first base station, which uses a frequency band (e.g. 2 GHz) according to a 4G communication system, and a second base station, which uses an ultra-high frequency band (e.g. 28 GHz).

If a UE changes a wireless access point from the first base station to the second base station or adds the second base station so as to concurrently use two wireless access points, then a bandwidth provided to the UE may increase up to several tens to several hundreds of times. On the contrary, if a UE changes a wireless access point from the second base station to the first base station, or if the UE releases a connection to the second base station while concurrently using two wireless access points including the first base station and the second base station and then uses a wireless access point of the first base station, then a bandwidth provided to the UE may decrease by up to several tenths or several hundredths.

However, since a TCP protocol does not provide a way to provide data in response to such a rapid change of the bandwidth, it takes a predetermined time until a transmission device based on the TCP protocol controls a data transmission rate according to the bandwidth.

Further, the efficiency of a frequency resource is reduced until the transmission device based on the TCP protocol controls the data transmission rate.

SUMMARY

To address the above-discussed deficiencies, it is a primary object to provide a device and method for rapidly adjusting the data transmission rate of a TCP layer in response to a rapid change of a wireless communication bandwidth due to an access change.

Further, the present disclosure proposes a device and method for rapidly increasing the data transmission rate of a TCP layer in accordance with a rapid increase of a wireless communication bandwidth due to an access change.

Further, the present disclosure proposes a device and method for rapidly decreasing the data transmission rate of a TCP layer in accordance with a rapid decrease of a wireless communication bandwidth due to an access change.

An operation method of a Transmission Control Protocol (TCP) reception device in a wireless communication system, according to various embodiments of the present disclosure for solving the above-mentioned problems, may include: determining whether an access change from a first node using a first Radio Access Technology (RAT) to a second node using a second RAT occurs; and transmitting, to a TCP transmission device, information instructing to adjust the TCP transmission rate when an access change from the first node to the second node occurs.

An operation method of a Transmission Control Protocol (TCP) transmission device in a wireless communication system, according to various embodiments of the present disclosure for solving the above-mentioned problems, may include: receiving information instructing to adjust a TCP transmission rate from a TCP reception device; deciding the transmission rate of the TCP reception device on the basis of the information; and transmitting TCP data to the TCP reception device at the decided transmission rate.

A Transmission Control Protocol (TCP) reception device in a wireless communication system, according to various embodiments of the present disclosure for solving the above-mentioned problems, may include: a communication unit; and a controller configured to: determine whether an access change from a first node using a first Radio Access Technology (RAT) to a second node using a second RAT occurs; and transmit information instructing to adjust a TCP transmission rate to a TCP transmission device through the communication unit when an access change from the first node to the second node occurs.

A Transmission Control Protocol (TCP) transmission device in a wireless communication system, according to various embodiments of the present disclosure for solving the above-mentioned problems, may include: a communication unit; and a controller configured to: receive information instructing to adjust a TCP transmission rate from a TCP reception device; decide the transmission rate of the TCP reception device on the basis of the information: and transmit TCP data to the TCP reception device at the decided transmission rate.

The present disclosure can rapidly adjust a data transmission rate in response to a rapid change of a bandwidth due to an access change, thereby preventing unnecessary packet loss and retransmission from happening.

Further, the present disclosure can rapidly increase a data transmission rate in accordance with a rapid increase of a bandwidth due to an access change, thereby reducing a wasteful use of resources.

Further, the present disclosure can rapidly decrease a data transmission rate in accordance with the rapid decrease of a bandwidth due to an access change, thereby preventing unnecessary packet loss and retransmission from happening.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
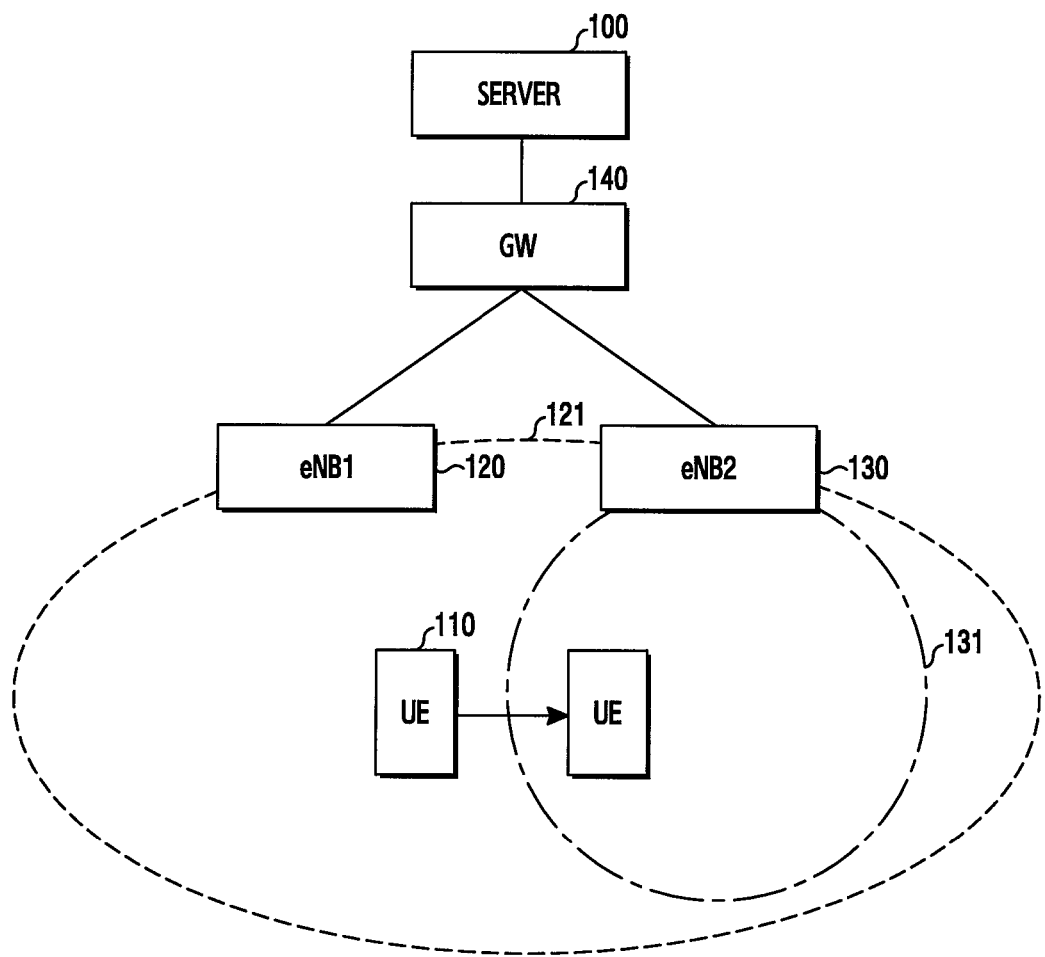
FIG. 1 illustrates block diagram of a communication system according to various embodiments of the present disclosure.

FIGS. 1 through 17, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

Hereinafter, the operational principle of the present disclosure will be described in detail with reference to the accompanying drawings. In describing the present disclosure below, a detailed description of related known configurations or functions incorporated herein will be omitted when it is determined that the detailed description thereof may unnecessarily obscure the subject matter of the present disclosure. The terms which will be described below are terms defined in consideration of the functions in the present disclosure, and may be different according to users, intentions of the users, or customs. Therefore, the definitions of the terms should be made based on the contents throughout the specification.

The present disclosure may have various embodiments, and modifications and changes may be made therein. Therefore, the present disclosure will be described in detail with reference to particular embodiments shown in the accompanying drawings. However, it should be understood that there is no intent to limit various embodiments of the present disclosure to the particular embodiments disclosed herein, but the present disclosure should be construed to cover all modifications, equivalents, and/or alternatives falling within the spirit and scope of the various embodiments of the present disclosure. In describing the drawings, similar reference numerals are used to designate similar elements.

As used in various embodiments of the present disclosure, the expressions "include", "may include", and other conjugates refer to the existence of a corresponding disclosed function, operation, or constituent element, and do not limit one or more additional functions, operations, or constituent elements. Further, as used in various embodiments of the present disclosure, the terms "include", "have", and their conjugates are intended merely to denote a certain feature, numeral, step, operation, element, component, or a combination thereof and should not be construed to initially exclude the existence of or a possibility of addition of one or more other features, numerals, steps, operations, elements, components, or combinations thereof.

Further, as used in various embodiments of the present disclosure, the expression "or" includes any or all combinations of words enumerated together. For example, the expression "A or B" may include A, may include B, or may include both A and B.

FIG. 1 illustrates block diagram of a communication system according to various embodiments of the present disclosure.

Referring to FIG. 1, the communication system may include a User Equipment (UE) 110, an eNodeB (eNB)1 120, an eNB2 130, a GateWay (GW) 140, and a server 100.

Examining respective elements, a server 100 may transmit or receive data to or from the UE 110 via the GW 140 and the eNB1 120 or via the GW 140 and the eNB2 130. According one embodiment, the server 100 may transmit or receive data to or from the UE 110, depending on a Transmission Control Protocol (TCP). The UE 110 may communicate with the eNB1 120 or the eNB2 130. For example, the UE 110 may, through the eNB1 120 or the eNB2 130, receive TCP data from the server 100 or transmit a TCP acknowledge (ACK) message to the server 100.

The GW 140 may receive data from the server 100 and then transmit the data to the eNB1 120 or the eNB2 130. For example, the GW 140 may be a serving gateway (SGW), a packet delivery network gateway (PGW), or a system architecture evolution-gateway (SAE-GW) of a 3GPP network. The eNB1 120 uses a first Radio Access Technology (RAT) and may have a cell 121 thereof. When connected to the UE 110, the eNB1 120 may receive data from the UE 110 and then transmit the data to the GW 140 or may receive data from the GW 140 and then transmit the data to the UE 110. The eNB2 130 uses an RAT2 and may have a cell 131 thereof. When the eNB2 130 is connected to the UE 110, the eNB2 130 may receive data from the UE 110 and then transmit the data to the GW 140 or may receive data from the GW 140 and then transmit the data to the UE 110. For example, a node using the RAT1 and the RAT2 may be a node which corresponds to a base station or a wireless access point (AP) of a general mobile communication network. Specifically, a node using the RAT1 and the RAT2 may be an eNB of a 3GPP network or a particular cell of the eNB. Further, a node using the RAT1 and the RAT2 may be an AP in an Institute of Electrical and Electronics Engineers (IEEE) 802.11-based wireless LAN.

According to one embodiment, the RAT1 may be an RAT which has a relatively smaller bandwidth than the RAT2. For example, the eNB1 120 may be a macro base station that uses a 4G communication band in which the coverage of the cell 121 is wider than that of the eNB2 130, and the eNB2 130 may be a micro base station that is connected in the form of Dual Connectivity defined in the 3GPP Rel-12 standard. According to another example, the eNB1 120 may be a Long Term Evolution (LTE) base station in which the cell 121 has a wider coverage, and the eNB2 130 may be a wireless LAN AP which is connected in the form of WLAN integration defined in the 3GPP Rel-13 standard. According to another example, the eNB1 120 may be a macro base station using a 2 GHz band and the eNB2 130 may be a micro base station using a millimeter band (e.g. 28 GHz or 60 GHz).

Meanwhile, FIG. 1 illustrates that the cell 121 of the eNB1 120 includes the cell 131 of the eNB2 130. However, this is merely one embodiment and the present disclosure is not limited thereto. For example, the cell 131 of the eNB2 130 may partially overlap with the cell 121 of the eNB1 120. The present disclosure may be applied when an access change occurs between the eNB1 120 and the eNB2 130 in the case where there is a relatively large bandwidth difference (e.g., several times to several tens of times) between the RAT1 and the RAT2. For example, an access change may include: a case where the UE 110 changes a wireless access point from the eNB1 120 to the eNB2 130; a case where the UE 110 adds the eNB2 130 while the UE 110 is connected to the eNB1 120 and uses two wireless access points together; a case where the UE 110 changes a wireless access point from the eNB2 130 to the eNB1 120; and a case where the UE releases the connection to the eNB2 130 while using the eNB1 120 and the eNB2 130 together, and then is connected to and uses only the eNB1 120.

A main function of a TCP includes a congestion control and a flow control. The congestion control is a function of reducing the number of packets, which standby in a network, so as to prevent or control congestion before the congestion happens. For example, the congestion control refers to a function of controlling an amount of data so as not to exceed the processing ability of network equipment (e.g. eNB1 120, eNB2 130, GW 140) located on an intermediate path when a terminal (TCP transmission terminal) (e.g. server 100) for transmitting TCP data transmits data to a terminal (TCP reception terminal) (e.g. UE 110) for receiving TCP data. The flow control is a function of controlling a data transmission rate of a TCP transmission terminal so that the TCP transmission terminal does not transmit data at a speed exceeding the data processing speed of a TCP reception terminal.

A sliding window flow control protocol has been proposed in order to control the flow control function. Further, a TCP congestion control mechanism has been proposed in order to provide the congestion control function. In relation to the TCP congestion control mechanism, various versions such as TCP Tahoe, TCP Reno, TCP NewReno, and TCP Vegas have been proposed and implemented, and a recently implemented congestion control algorithm includes slow start, congestion avoidance, fast retransmit, and fast recovery.

In one embodiment, if, while communicating with the server 100, the UE 110 changes access from the eNB1 120 using the RAT1 to the eNB2 130 using the RAT2 when the bandwidth of the RAT2 is relatively larger than the bandwidth of the RAT1, a bandwidth provided to the UE 110 may become several times to several hundreds of times wider. However, the server 100 may not recognize the above-mentioned situation of the UE 110, and may thereby increase the size of a congestion window (CWND) whenever receiving a TCP ACK message from the UE 110 according to congestion control algorithm and generate and transmit TCP data according to the increased size of the CWND.

According to an embodiment, if the congestion control algorithm is a congestion avoidance state, the size of a CWND will linearly increase by the maximum segment size (MSS) per round trip time (RTT). The RTT refers to the time it takes for a packet to make a round trip to an opposite host (e.g. UE 110) on a packet network (Internet).

However, when the bandwidth provided to the UE 110 rapidly increases by several times or up to several hundreds of times as described above, it takes a very long time for the server 100 to increase the size of a CWND in accordance with the bandwidth, and thus a resource may be wasted.

According to another embodiment, when the UE 110 changes access from the eNB2 130 to the eNB1 120 while communicating with the server 100, a bandwidth provided to the UE 110 may become narrower by several times to several hundreds of times. However, the server 100 does not recognize the above-mentioned situation of the UE 110, and may thereby transmit data exceeding the amount of data which the UE 110 can permit. Therefore, congestion occurs on a network (e.g. between the eNB1 120 and the UE 110), thereby causing a large amount of data loss and thus wasting a resource.

In order to prevent the above-mentioned loss of resources, in an embodiment, when a bandwidth becomes relatively wide due to an access change from the eNB1 120 to the eNB2 130, the UE 110 or the eNB1 120 may generate an optimistic TCP ACK message and transmit the optimistic TCP ACK message to the server 100. For example, the optimistic TCP ACK message may be a TCP ACK message transmitted before TCP data is received, assuming that the TCP data is successfully received in a state in which the UE 110 has not received the TCP data. The server 100 may increase the size of a CWND as the optimistic TCP ACK message is received. According to another embodiment, when a communication system includes a TCP proxy server, the eNB1 120 may transmit, to the TCP proxy server, a TCP transmission rate instruction message including information on the bandwidth of the RAT2 related to the eNB2 130. Further, the TCP proxy server may increase the CWND size of the server 100 on the basis of the received information on the bandwidth of the RAT2.

As still another embodiment, when the bandwidth becomes relatively narrow due to an access change from the eNB2 130 to the eNB1 120, the UE 110 or the eNB1 120 may generate and transmit a TCP ACK message including an amount of data that the UE 110 is allowed to receive. Further, the server 100 may decrease the CWND size on the basis of the amount of data that the UE 110 is allowed to receive, which is included in the TCP ACK message.

According to another embodiment, when a communication system includes a TCP proxy server, the eNB1 120 may transmit, to the TCP proxy server, information on the bandwidth of the RAT1 related to the eNB1 120. Further, the TCP proxy server may decrease the CWND size of the server 100 on the basis of the received information on the bandwidth of the RAT1.

Figure 2:
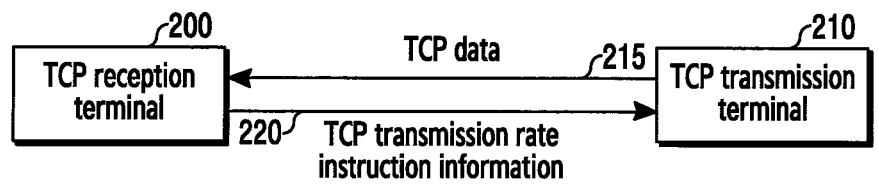
FIG. 2 illustrates a block diagram of a communication system according to various embodiments of the present disclosure.

FIG. 2 illustrates block diagram of a communication system according to various embodiments of the present disclosure.

Referring to FIG. 2, the communication system may include a TCP reception terminal 200 and a TCP transmission terminal 210. For example, the TCP reception terminal 200 is a terminal for receiving TCP data and may be the UE 110 or the eNB1 120 in FIG. 1. Further, the TCP transmission terminal 210, which is a terminal for transmitting TCP data, may be the server 100 in FIG. 1 or a TCP proxy server that controls the server 100.

When an access change between a node supporting the RAT1 and a node supporting the RAT2 occurs while TCP data 215 is transmitted and/or received according to a TCP between the TCP reception terminal 200 and the TCP transmission terminal 210, the TCP reception terminal 200 may transmit TCP transmission rate instruction information 220 to the TCP transmission terminal 210.

Here, the TCP transmission rate instruction information 220 is information that instructs the TCP transmission terminal 210 to adjust the transmission rate of TCP data. For example, the TCP transmission rate instruction information 220 may be at least one of a TCP ACK message and a TCP transmission rate instruction message.

According to an embodiment, when a bandwidth is enlarged due to an access change from a node supporting the RAT1 to a node supporting the RAT2, the TCP reception terminal may transmit, as TCP transmission rate instruction information, an optimistic TCP ACK message or a TCP transmission rate instruction message. For example, the optimistic TCP ACK message may be a TCP ACK message which is transmitted before the TCP reception terminal itself (e.g. UE 110) or the UE 110 connected to the TCP reception terminal (e.g. eNB1 120) receives TCP data, assuming that the TCP data is successfully received. For example, the TCP transmission rate instruction message may include information on the bandwidth of the RAT2. For example, the information on the bandwidth of the RAT2 may include the bandwidth of the RAT2 or a data transmission rate which the TCP reception terminal wants.

According to another embodiment, when a bandwidth is reduced due to an access change from a node supporting the RAT1 to a node supporting the RAT2, the TCP reception terminal may transmit, as TCP transmission rate instruction information, a TCP ACK message or a TCP transmission rate instruction message. For example, the TCP ACK message may include the amount of data which can be received with respect to the TCP reception terminal itself (e.g. UE 110) or the UE 110 connected to the TCP reception terminal (e.g. eNB1 120). For example, the amount of data which can be received may be the size of a receiving window (RWND).

The TCP transmission terminal 210 may receive TCP transmission rate instruction information from the TCP reception terminal 200, determine a transmission rate on the basis of the received TCP transmission rate instruction information, and transmit TCP data to the TCP reception terminal 200 at the determined transmission rate.

In an embodiment, when an optimistic TCP ACK message is received as TCP transmission rate instruction information, the TCP transmission terminal 210 may determine the size of CWND according to the optimistic TCP ACK message and transmit TCP data according to the determined size of CWND. In another embodiment, when a TCP ACK message is received as TCP transmission rate instruction information, the TCP transmission terminal 210 may determine the size of CWND on the basis of the amount of data, which can be received by a TCP reception terminal, included in the TCP ACK message and may transmit TCP data according to the determined size of CWND. In another embodiment, when a TCP transmission rate instruction message is received as TCP transmission rate instruction information, the TCP transmission terminal 210 may determine the size of CWND on the basis of RAT bandwidth information included in the TCP transmission rate instruction message and transmit TCP data according to the determined size of CWND.

Figure 3:
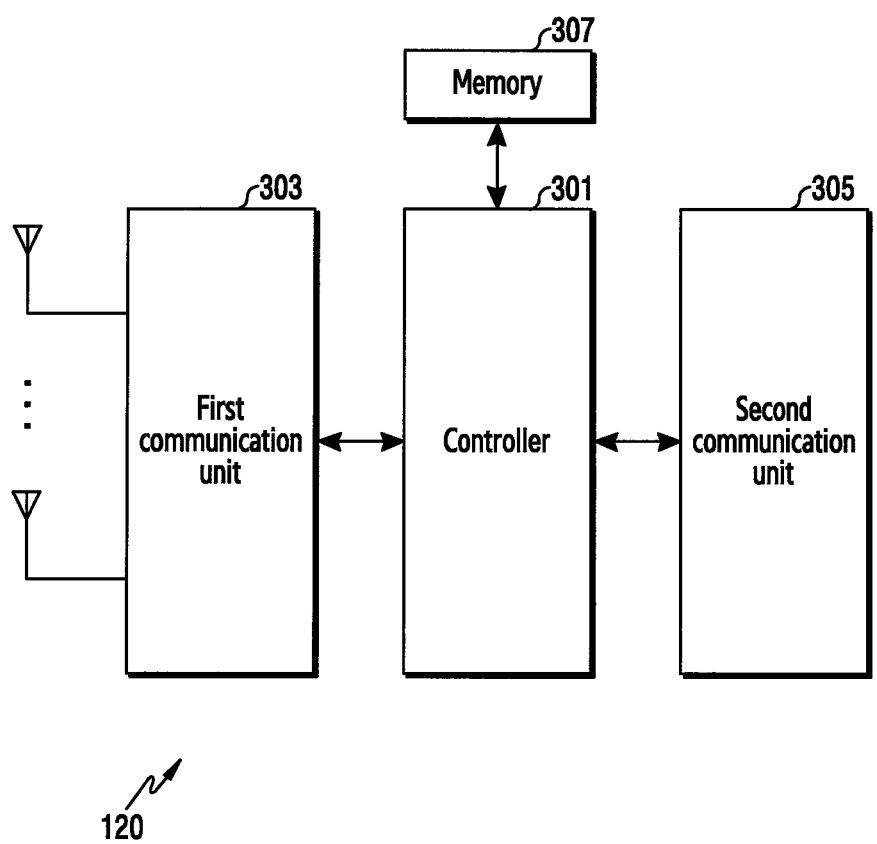
FIG. 3 illustrates block diagram of an eNB according to various embodiments of the present disclosure.

FIG. 3 illustrates block diagram of an eNB according to various embodiments of the present disclosure.

According to an embodiment, FIG. 3 may be a block diagram of a node corresponding to the RAT1. For example, an eNB may be the eNB1 120 in FIG. 1. Referring to FIG. 3, the eNB1 120 may include a controller 301, a first communication unit 303, and a second communication unit 305, and a memory 307. According to an embodiment, the eNB1 120 may further include a first timer and a second timer.

Examining the respective elements, the first communication unit 303 may transmit or receive a signal to or from at least one communication device. For example, the first communication unit 303 may wirelessly communicate with the eNB2 130 or the UE 110. For example, the first communication unit 303 may include an RF processing unit and a baseband processing unit. The RF processing unit performs functions, such as band conversion or amplification of a signal, for transmitting and/or receiving a signal through a wireless channel. In other words, the RF processing unit up-converts a baseband signal provided from the baseband processing unit into an RF band signal and then transmits the RF band through an antenna; and down-converts an RF band signal received through an antenna into a baseband signal. For example, the RF processing unit may include a transmission filter, a reception filter, an amplifier, a mixer, an oscillator, a Digital-to-Analog Converter (DAC), an Analog-to-Digital Converter (ADC), and the like. Further, the RF processing unit may include multiple RF chains. Further, the RF processing unit may perform beamforming. For the beamforming, the RF processing unit may adjust a phase and size of each of signals transmitted and/or received through multiple antennas or elements of an antenna.

The baseband processing unit performs a conversion function between a baseband signal and a bit sequence according to a physical layer standard of a system. For example, at the time of data transmission, the baseband processing unit encodes and modulates a transmission bit sequence, thereby generating complex-valued symbols. When data is received, the baseband processing unit restores a received bit sequence through demodulating and decoding a baseband signal provided from the RF processing unit. For example, according to an OFDM scheme, at the time of data transmission, the baseband processing unit generates complex-valued symbols by encoding and modulating a transmission bit sequence, maps the complex-valued symbols to subcarriers, and then configures OFDM symbols through an inverse fast Fourier transform (IFFT) calculation and a cyclic prefix (CP) insertion. When data is received, the baseband processing unit divides a baseband signal provided from the RF processing unit in units of OFDM symbol, restores signals mapped to subcarriers through an fast Fourier transform (FFT) calculation, and then restores a received bit sequence through demodulation and decoding. The baseband processing unit and the RF processing unit transmits or receives a signal as described above. Therefore, the first communication unit 303 may be referred to as a transmission unit, a transmission/reception unit, or a wireless communication unit.

The second communication unit 305 may provide an interface for wiredly or wirelessly communicating with other nodes in a network. In other words, the second communication unit 305 may communicate with the eNB1 120 and another node, such as the eNB 130 or a core network (e.g. server 100) connected to the eNB1 120. For example, the second communication unit 305 converts a bit sequence transmitted to the server 100 into a physical signal and converts a physical signal received from the server 100 into a bit sequence.

The memory 307 stores data, such as default programs, an application programs, and setting information, for an operation of the eNB1 120. For example, the memory 307 may store a sequence number of a TCP ACK message recently received from the UE 110. As another example, the memory 307 may store information on the bandwidth of a second RAT 130 or bandwidth-related information thereof (of a first RAT 120). Further, the memory 307 may provide stored data in response to a request of the controller 301.

The first timer and the second timer may operate under a control of the controller 301. For example, the first timer is operated for a predetermined first time and may output, to the controller 301, a signal notifying of the expiration of the first time when the first time expires. As another example, the second timer is operated for a predetermined second time, and may output, to the controller 301, a signal notifying of the expiration of the second time when the second time expires.

The controller 301 controls general operations of the eNB1 120. For example, the controller 301 may transmit or receive a signal through the first communication unit 303 or the second communication unit 305. Further, the controller 301 may record or read data in the memory 307.

According to an embodiment of the present disclosure, the controller 301 may receive a TCP data segment from the server 100 and transmit the received TCP data segment to the UE 110. Further, the controller 301 may receive a measurement report from the UE 110. Here, the measurement report may include signal intensity information related to at least one neighboring node (e.g. eNB2 130).

In an embodiment, the controller 301 may determine to add, as a Secondary eNB (SeNB), one of one or more eNBs adjacent to the UE 110, on the basis of the received measurement report. Meanwhile, the eNB1 120 corresponding to the RAT1 may be referred to as a Master eNB (MeNB). For example, the controller 301 may determine, as an SeNB, an eNB having larger signal intensity than a pre-designated reference value among one or more eNBs. For example, the controller 301 may determine the eNB2 130 as an SeNB.

The controller 301 may transmit an SeNB addition request message to the eNB2 130 determined as an SeNB. For example, the SeNB addition request message may be a message which is sent to the eNB2 130 and includes inquiry about whether the UE 110 can be connected to the eNB2 130. For example, the SeNB addition request message may include identifier information of the UE 110, data traffic capacity which is being used by the UE 110, and the like. Further, the controller 301 may receive an SeNB addition request ACK message from the eNB2 130 in response to the SeNB addition request message. For example, the SeNB addition request ACK message may include identifier information of the UE 110, information indicating whether to receive data traffic capacity which is being used by the UE 110, and a parameter required when the UE 110 accesses the eNB2 130. For example, the parameter may include information on the bandwidth of the RAT2 related to the eNB2 130.

Further, the controller 301 may generate a Radio Resource Control (RRC) connection reconfiguration message on the basis of the SeNB addition request ACK message and transmit the RRC connection reconfiguration message to the UE 110. For example, the RRC connection reconfiguration message may be a message which requests the UE 110 to be connected to the eNB2 130. For example, the RRC connection reconfiguration message may include information on the bandwidth of the RAT2 related to the eNB2 130.

Further, the controller 301 may identify the bandwidths of the RAT1 and the RAT2. The bandwidth of the RAT1 is the bandwidth of the eNB1 120 itself and thus RAT1 bandwidth-related information may be pre-stored in the memory 307. For example, the controller 301 may identify the bandwidth of the RAT1 on the basis of the RAT1 bandwidth-related information.

If the SeNB addition request ACK message includes RAT2 bandwidth-related information, the controller 301 may identify the bandwidth of the RAT2 on the basis of the RAT2 bandwidth-related information. If the SeNB addition request ACK message does not include RAT2 bandwidth-related information, the controller 301 may communicate with the eNB2 130 through the second communication unit 305, thereby directly receiving the RAT2 bandwidth-related information.

The controller 301 may compare the bandwidth of the RAT1 with the bandwidth of the RAT2. When the bandwidth of the RAT1 is identical to the bandwidth of the RAT2, the controller 301 may receive TCP data at the same data transmission rate as an existing data transmission rate and transmit the received TCP data to the UE 110.

According to an embodiment, when the bandwidth of the RAT1 and the bandwidth of the RAT2 are not identical to each other, the controller 301 may identify whether the bandwidth of the RAT2 exceeds the bandwidth of the RAT1. When the bandwidth of the RAT2 exceeds the bandwidth of the RAT1, the controller 301 may detect a sequence number from a TCP ACK segment recently received from the UE 110, store the sequence number, and then transmit the received TCP ACK segment to the server 100. The controller 301 may generate an optimistic TCP ACK segment on the basis of the stored sequence number and transmit the generated optimistic TCP ACK segment to the server 100. For example, the optimistic TCP ACK segment may be a TCP ACK segment which the controller 301 transmits before the UE 110 receives TCP data segment, optimistically assuming that the corresponding TCP data segment is successfully received. A scheme of generating the optimistic TCP ACK segment will be specifically described with reference to FIG. 5.

The server 100 may receive an optimistic TCP ACK segment as soon as a TCP data segment is transmitted. The server 100 may increase the size of a CWND according to the optimistic TCP ACK segment. Further, the server 100 may transmit the following TCP data segment according to the increased size of CWND. Through the above-described operation, the server 100 may increase a TCP data transmission rate in accordance with the increase of the RAT2 bandwidth of the UE 110, thereby transmitting TCP data at a transmission rate suitable for the RAT2 bandwidth.

Therefore, the controller 301 may receive a TCP data segment at a data transmission rate increased according to the RAT2 bandwidth and transmit the received TCP data segment to the UE 110.

As a result of the identifying of whether the bandwidth of the RAT2 exceeds the bandwidth of the RAT1, when the bandwidth of the RAT2 does not exceed the bandwidth of RAT1, the controller 301 may determine that the bandwidth of the RAT2 is narrower than the bandwidth of the RAT1. The controller 301 may receive a TCP ACK segment from the UE 110; determine an RWND according to the bandwidth of the RAT2; change the received TCP ACK segment so that the received TCP ACK segment includes the determined RWND; and transmit the changed TCP ACK segment to the server 100. For example, the controller 301 may determine an RWND according to the bandwidth of the RAT2. For example, the determined RWND may be included in a window field of the TCP ACK segment. For example, the controller 301 may determine an RWND by using Equation 1 below.

$$RWND = \min[(\text{Bandwidth at Target RAT} \times \text{Estimated RTT})/8, \text{Actual RWND Size}] \quad \text{[Equation 1]}$$

In Equation 1, "Bandwidth at Target RAT" indicates a bandwidth (bits per second) with which the UE 110 is predicted to be provided from the eNB1 120 or which has been received from the eNB1 120, and "Estimated RTT" indicates RTT between the UE 110 and the server 100. For example, "Estimated RTT" may be determined by using a general RTT calculation scheme which is used in a TCP protocol.

The server 100 may receive a TCP ACK segment corresponding to a TCP data segment and decrease the size of a CWND on the basis of an RWND included in the received TCP ACK segment. Further, the server 100 may transmit the following TCP data segment according to the decreased size of CWND. Through the above-described operations, the server 100 may decrease a TCP data transmission rate in accordance with the decrease of the RAT2 bandwidth of the UE 110, thereby transmitting TCP data at a transmission rate suitable for the RAT2 bandwidth.

Therefore, the controller 301 may receive TCP data at a data transmission rate decreased according to the RAT2 bandwidth and transmit the received TCP data to the UE 110.

According to another embodiment, when the bandwidth of the RAT1 and the bandwidth of the RAT2 are not identical to each other, the controller 301 may identify the bandwidth of the RAT2. Further, the controller 301 may generate a TCP transmission rate instruction message on the basis of the identified bandwidth of the RAT2 and transmit the TCP transmission rate instruction message to the TCP proxy server. For example, the TCP transmission rate instruction message may be a message which instructs the server 100 to control the transmission rate of TCP data. For example, the TCP transmission rate instruction message may include information on the bandwidth of the RAT2. For example, the information on the bandwidth of the RAT2 may include the bandwidth of the RAT2 or a TCP data transmission rate (e.g. 100 Mbps) which the UE 110 wants.

The TCP proxy server may receive a TCP transmission rate instruction message and detect information on the bandwidth of the RAT2 from the received TCP transmission rate instruction message. Further, the TCP proxy server may increase or decrease the size of a CWND of the server 100 on the basis of the information on the bandwidth of the RAT2. Further, the server 100 may transmit the following TCP data segment according to the increased or decreased size of the CWND. Through the above-described operations, the server 100 may increase or decrease a TCP data transmission rate in accordance with the increase or decrease of the RAT2 bandwidth of the UE 110, thereby transmitting TCP data at a transmission rate suitable for the bandwidth of the RAT2.

Therefore, the controller 301 may receive TCP data at a data transmission rate increased or decreased according to the RAT2 bandwidth and transmit the received TCP data to the UE 110.

Figure 4:
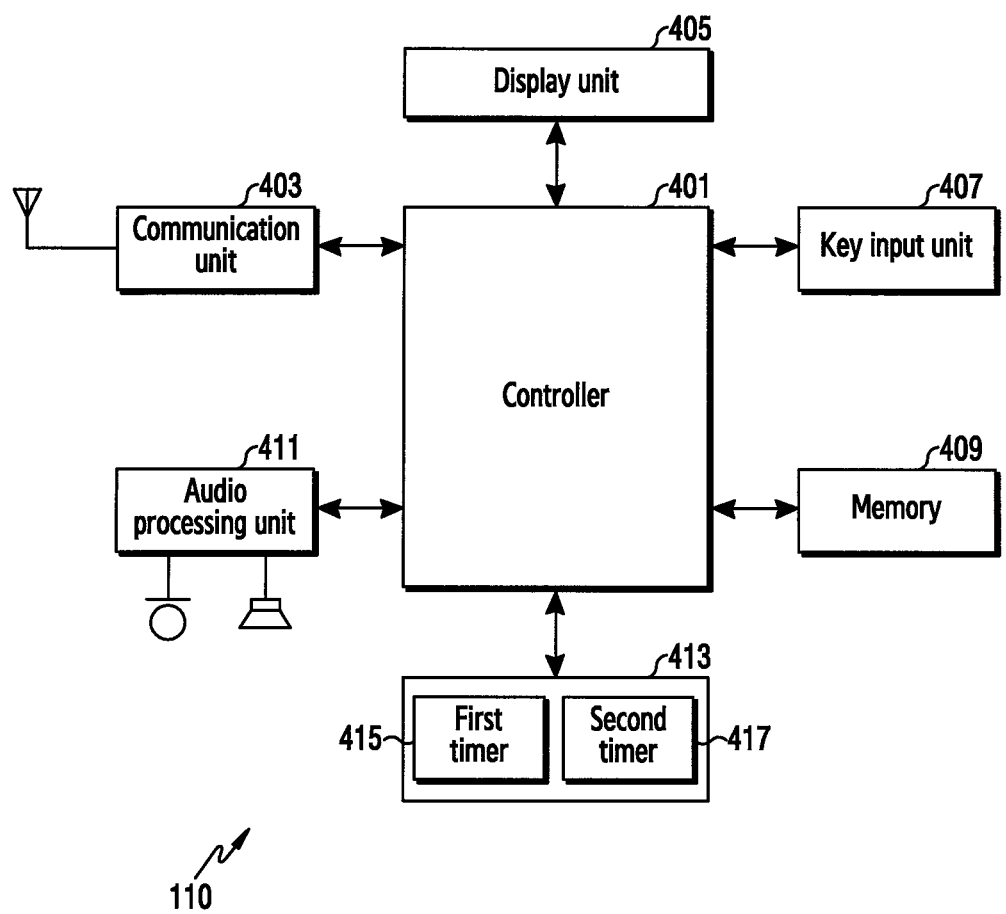
FIG. 4 illustrates block diagram of a user equipment according to various embodiments of the present disclosure.

FIG. 4 illustrates block diagram of the UE according to various embodiments of the present disclosure.

Referring to FIG. 4, the UE 110 may include a controller 401, a communication unit 403, a display unit 405, a key input unit 407, a memory 409, an audio processing unit 411, and a timer 413.

Examining the respective elements, the communication unit 403 may include an RF unit and a modem. The RF unit may include an RF transmitter configured to up-convert and amplify the frequency of a transmitted signal, an RF receiver configured to low-noise amplify a received signal and down-convert the frequency thereof, and the like. The modem includes a transmitter that codes and modulates a signal to be transmitted and a receiver that decodes and demodulates a signal received by the RF unit.

The audio processing unit 411 may include a codec and the codec may include a data codec and an audio codec. The data codec may process packet data or the like and the audio codec may process an audio signal such as a voice and a multimedia file. The audio processing unit 411 may convert a digital audio signal received in the modem into an analog signal through the audio codec and reproduce the analog signal or may convert an analog audio signal generated from a microphone into a digital audio signal through the audio codec and transmit the digital audio signal to the modem. The codec may be provided separately from the audio processing unit 411 or may be included in the controller 401.

The key input unit 407 may include keys required to input numeral or character information, function keys required to set various functions, and a touch pad. When the display unit 405 is implemented in a scheme of a capacitive or resistive touch display screen, the key input unit 407 may include only a minimum of preset keys. The display unit 405 may partially replace a key input function of the key input unit 407.

The memory 409 may be constituted by a program memory and data memories, and the program memory stores a program for controlling a general operation of a portable terminal. The memory 409 may further include an external memory, such as a Compact Flash (CF), a Secure Digital (SD), a Micro Secure Digital (Micro-SD), a Mini Secure Digital (Mini-SD), an Extreme Digital (xD), and MultiMediaCard (MMC). Further, the memory 409 may include a disk, such as a Hard Disk Drive (HDD) and a Solid State Disk (SSD).

The display unit 405 may be configured by a Liquid Crystal Display (LCD) or an Organic Light Emitting Diode (OLED) (e.g., PMOLED or AMOLED) and may output various pieces of display information generated in the UE 110. The display unit 405 may be operated as an input unit configured to control the UE 110 together with the key input unit 407, including a capacitive or resistive touch screen.

The timer 413 may include a first timer 415 and a second timer 417, and the first timer 415 and the second timer 417 may be operated under a control of the controller 401. For example, the first timer 415 is operated for a predetermined first time and may output, to the controller 401, a signal notifying of the expiration of the first time when the first time expires. As another example, the second timer 417 is operated for a predetermined second time, and may output, to the controller 401, a signal notifying of the expiration of the second time when the second time expires.

The controller 401 may control a general operation of a portable terminal according to an embodiment of the present disclosure, and may switch and control an operation of a UE according to a user input which is provided through the key input unit 407 or the display unit 405. Further, the controller 401 may switch and control an operation of a UE according to a signal received through the communication unit 403.

According to an embodiment of the present disclosure, the controller 401 may receive a TCP data segment from the server 100 through the eNB1 120. Further, the controller 401 may generate a measurement report and transmit the measurement report to the eNB1 120. For example, the measurement report may include signal intensity information related to at least one neighboring node.

Further, the controller 401 may receive an RRC connection reconfiguration message for an access change from the eNB1 120 to the eNB2 130. For example, the RRC connection reconfiguration message may include information on the bandwidth of the RAT2 related to the eNB2 130.

Further, the controller 401 may identify the bandwidths of the RAT1 and the RAT2. The RAT1 is an RAT to which the UE 110 is being currently connected, and thus RAT1 bandwidth-related information may be pre-stored in the memory 409. In this case, the controller 401 may identify the bandwidth of the RAT1 on the basis of the RAT1 bandwidth-related information.

If the RRC connection reconfiguration message includes RAT2 bandwidth-related information, the controller 401 may identify the bandwidth of the RAT2 on the basis of the RAT2 bandwidth-related information.

If the RRC connection reconfiguration message does not include information on the bandwidth of the RAT2, the controller 401 may directly receive the information on the bandwidth of the RAT2 from a node (e.g. eNB2 130) using the RAT2. For example, when the corresponding node is a wireless LAN AP according to the IEEE 802.11 standard, the controller 401 may acquire information on the bandwidth of the RAT2 in process of setting a traffic stream (TS) with an AP 130.

For example, the controller 401 may transmit an ADD Traffic Stream (ADDTS) request frame to the AP 130 and may receive an ADDTS response frame in response to the ADDTS request frame. For example, the ADDTS response frame may include Traffic Specification (TSPEC) that is a standard of a traffic which the AP 130 ensures for the UE 110. Here, The TSPEC may include a minimum data rate, a mean data rate, and a maximum data rate. If the AP 130 does not support a TS setting function or refuses a TS configuration, the controller 401 may receive a beacon frame from the AP 130. For example, the beacon frame may include a wireless LAN channel load measured in the AP 130, a transmission rate supported by the AP 130 (supported data rate), a protocol version (e.g. HT Capability, VHT Capability, DMG Capability) supported by the AP 130, and the like.

Further, when the AP 130 supports Hotspot 2.0 of Wi-Fi Alliance (WFA), the controller 401 may transmit an Access Network Query Protocol (ANQP) query message, which requests information on an external network, to the AP 130 and receive an ANQP response message in response to the ANQP query message. For example, the ANQP response message may include information on an external network. For example, the information on the external network may be WAN Metric transmitted from the AP 130 to an external Internet.

As another example, when an Access Network Discovery and Selection Function (ANDSF) server is included in a communication system, the controller 401 may receive statistical information from the ANDSF server. For example, the ANDSF server may be a server configured to perform a function similar to that of the ANDSF server or to transmit information similar to information transmitted by the ANDSF server.

For example, the statistical information may include statistics of bandwidth information of RATs according to a time, location, or radio condition. Here, the time condition may include a daily start time, a start/stop time, a start date, a stop date, a day of the week. The location condition may include: a 3GPP identifier including Public Land Mobile Network Identity (PLMN ID) and Evolved Universal Terrestrial Radio Access (EUTRA) Cell Id; an IEEE wireless LAN identifier including an homogenous extended service set identifier (HESS ID), a service set identifier (SSID), and a basic service set identifier (BSSID); a geographical coordinates including latitude, longitude, etc.; and the like. Further, the radio condition may include a channel quality (CQI) range, a received signal strength indication (RSSI) range, a reference signal received power (RSRP) range, a reference signal received quality (RSRQ) range, etc.

The controller 401 may acquire information on the bandwidth of the RAT2 by using the above-described scheme and estimate the bandwidth of the RAT2 on the basis of the acquired information on the bandwidth of the RAT2.

The controller 401 may compare the bandwidth of the RAT1 with the bandwidth of the RAT2. As a result of the comparison, when the bandwidth of the RAT1 is identical to the bandwidth of the RAT2, the controller 401 may receive TCP data at the same data transmission rate as an existing data transmission rate.

On the contrary, when the bandwidth of the RAT1 and the bandwidth of the RAT2 are not identical to each other, the controller 401 may identify whether the bandwidth of the RAT2 exceeds the bandwidth of the RAT1. When the bandwidth of the RAT2 exceeds the bandwidth of the RAT1, the controller 401 may generate and transmit a TCP ACK segment corresponding to a TCP data segment received from the server 100, and may generate an optimistic TCP ACK segment and transmit the generated optimistic TCP ACK segment to server 100. For example, the optimistic TCP ACK segment may be a TCP ACK segment which the controller 401 transmits before the reception of TCP data segment, optimistically assuming that the corresponding TCP data segment is successfully received. A scheme of generating the optimistic TCP ACK segment will be specifically described with reference to FIG. 5.

After receiving a TCP data segment, the server 100 may receive an optimistic TCP ACK segment corresponding to the TCP data segment after passage of a time interval shorter than a previous time interval. Therefore, the server 100 may increase the size of a CWND according to the optimistic TCP ACK segment. Further, the server 100 may transmit the following TCP data segment according to the increased size of CWND. Through the above-described operations, the server 100 may increase a TCP data transmission rate in accordance with the increase of the RAT2 bandwidth of the UE 110, thereby transmitting TCP data at a transmission rate suitable for the RAT2 bandwidth.

Therefore, the controller 401 may receive TCP data at a data transmission rate increased according to the RAT2 bandwidth.

As a result of the identifying of whether the bandwidth of the RAT2 exceeds the bandwidth of the RAT1, when the bandwidth of the RAT2 does not exceed the bandwidth of RAT1, the controller 401 may determine that the bandwidth of the RAT2 is narrower than the bandwidth of the RAT1. Further, the controller 401 may receive a TCP data segment from the server 100, generate a TCP ACK segment including an RWND determined according to the bandwidth of the RAT2, and transmit the generated TCP ACK segment to the server 100. For example, the controller 401 may determine the size of an RWND by using Equation 1. For example, the determined RWND may be included in a window field of the TCP ACK segment.

The server 100 may receive a TCP ACK segment corresponding to a TCP data segment and decrease the size of a CWND on the basis of an RWND included in the received TCP ACK segment. Further, the server 100 may transmit the following TCP data segment according to the decreased size of CWND. Through the above-described operations, the server 100 may decrease a TCP data transmission rate in accordance with the decrease of the RAT2 bandwidth of the UE 110, thereby transmitting TCP data at a transmission rate suitable for the RAT2 bandwidth.

Therefore, the controller 401 may receive TCP data at a data transmission rate decreased according to the RAT2 bandwidth.

Figure 5:
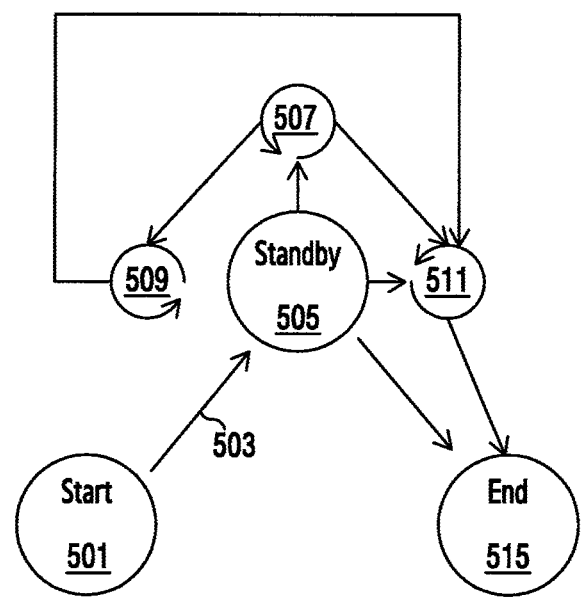
FIG. 5 illustrates a state transition according to various embodiments of the present disclosure.

FIG. 5 illustrates a state transition according to various embodiments of the present disclosure.

Hereinafter, reference is made to FIG. 5 to describe a scheme in which the UE 110 generates a new TCP ACK message and transmits the generated TCP ACK message to the server 100 so as to enable the server 100 to increase a TCP data transmission rate in accordance with a bandwidth, which is provided to the UE 110 after an access change of the UE 110 and which becomes several times to several hundreds of times wider. For the convenience of description, it is assumed below that the UE 110 performs the above-described scheme. However, the eNB1 120 or a node corresponding to the eNB1 120, other than the UE 110, may also perform the above-described scheme. According to an embodiment, the eNB2 130 or a node corresponding to the eNB2 130 may perform the above-described scheme.

The present disclosure discloses a scheme of increasing TCP data transmission rate is to increase the TCP data transmission rate of the server 100, in accordance with a bandwidth that is provided to the UE 110, by using a new TCP ACK segment received from the UE 110.

According to this scheme, before receiving a TCP data segment, the UE 110 may generate a TCP ACK segment corresponding to the TCP data segment and transmit the generated TCP data segment to the server 100, assuming the successful reception of the TCP data segment on the basis of an optimistic prediction. As described above, the TCP ACK segment transmitted before the TCP data segment is received may be referred to as an optimistic TCP ACK segment. The server 100 repeats generating and transmitting an optimistic TCP ACK segment until TCP data is received in accordance with the bandwidth of the UE 110.

The server 100 may receive the optimistic TCP ACK segment from the UE 110 and may calculate RTT according to the received TCP ACK segment.

Meanwhile, the increase of the size of a CWND of a TCP may be basically expressed by an RTT function. For example, when a congestion control algorithm of the server 100 is a slow-start state, the size of a CWND may increase according to an exponential function of RTT. For example, when a congestion control algorithm of the server 100 is a congestion avoidance state, the size of a CWND may increase according to a linear function of RTT. For example, the RTT may be calculated in a unit of millisecond.

As described above, the server 100 may increase the size of a CWND on the basis of the calculated size of RTT. Herein, the calculated RTT has been calculated on the basis of a received optimistic TCP ACK segment received directly after the transmission of a TCP data segment, and may thus be shorter than an actual RTT. Further, the server 100 may transmit TCP data on the basis of the increased size of a CWND. The server 100 may repeat increasing the size of a CWND on the basis of an optimistic TCP ACK segment until the server 100 transmits TCP data in accordance with a bandwidth provided to the UE 110.

Referring to FIG. 5, in order to transmit an optimistic TCP ACK segment, the state of the UE 110 may include a start state 501, a standby state 505, and an end state 515.

When information on the bandwidth of the eNB2 130 has been acquired through a mobile communication network (e.g., eNB1 120 or eNB2 130), the controller 401 of the UE 110 may transit to the start state 501. Further, the controller 401 may make a transition from the start state 501 to the standby state 505 via the first transition 503 and wait for an event. Herein, in the first transition 503, the UE 110 may initialize parameters of the UE 110 (e.g. a sequence number of TCP data which has been recently received, a sequence number of a TCP ACK segment which has been recently transmitted, and the number of times of transmission of an optimistic TCP ACK segment).

When a TCP data segment is received, the controller 401 may enter the second state 507. In the second state 507, the controller 401 may generate a general TCP ACK segment corresponding to the received TCP data segment and transmit the general TCP ACK segment to the server 100. If an optimistic TCP ACK segment corresponding to the received TCP data segment has been previously transmitted, the UE 110 may not make a response to a TCP ACK segment.

In sequence, the controller 401 may generate an optimistic TCP ACK segment and transmit the generated optimistic TCP ACK segment to the server 100. At this time, the controller 401 may add a value as large as an MSS size to a sequence number of a general TCP ACK segment which has been transmitted recently, thereby generating a sequence number of an optimistic TCP ACK segment. The controller 401 may generate and transmit an optimistic TCP ACK segment including the generated sequence number.

Herein, given that the general TCP data segment is transmitted in an MSS size, the sequence number of the optimistic TCP ACK segment is high likely to match a sequence number of a TCP data segment corresponding to the optimistic TCP ACK segment. Further, even when the sequence number of the optimistic TCP ACK segment does not match a sequence number of a TCP data segment corresponding to the optimistic TCP ACK segment, since the server 100 can transmit the following TCP data segment, the sequence number of the optimistic TCP ACK segment is functionally valid.

Further, when the server 100 does not transmit a TCP data segment corresponding to a sequence number described in a TCP ACK segment, the server 100 is implemented to ignore the corresponding TCP ACK segment. Therefore, the server 100 may transmit TCP data without any error even when the sequence number of the optimistic TCP ACK segment is different.

Further, in order not allow to the optimistic TCP ACK segment to be excessively transmitted before a TCP data segment is received, the controller 401 may determine, when the controller 401 generates the optimistic TCP ACK segment, whether to generate the optimistic TCP ACK segment on the basis of a difference between a sequence number of an optimistic TCP ACK segment which has been recently transmitted and a sequence number of a TCP data segment which has been recently received.

For example, the controller 401 may calculate a difference between a sequence number of an optimistic TCP ACK segment which has been transmitted recently and a sequence number of a TCP data segment which has been received recently; compare the calculated difference with the pre-designated threshold value; and determine whether to generate an optimistic TCP ACK segment on the basis of a result of the comparison. For example, as a result of the comparison, when the calculated difference is equal to or larger than the pre-designated threshold value, the controller 401 may not generate an optimistic TCP ACK segment. In another example, as a result of the comparison, when the calculated difference is smaller than the pre-designated threshold value, the controller 401 may generate an optimistic TCP ACK segment.

After an optimistic TCP ACK segment is transmitted, the controller 401 sets the first timer 415. Herein, the first timer 415 is a timer for transmitting the following optimistic TCP ACK segment at a predetermined time interval when an arrival time interval between TCP data segments is large. For example, when the first timer 415 is being executed, the controller 401 may reset the first timer 415. As another example, when the first timer 415 is not being executed, the controller 401 may start the first timer 415.

Further, the controller 401 may receive a TCP data segment and compare a sequence number of the received TCP data segment with a sequence number of a recent optimistic TCP ACK segment. As a result of the comparison, when the sequence number of the received TCP data segment is not a sequence number higher than the sequence number of the recent optimistic TCP ACK segment, the controller 401 may generate an optimistic TCP ACK segment.

On the contrary, when the sequence number of the received TCP data segment is a sequence number higher than the sequence number of the recent optimistic TCP ACK segment, the controller 401 may set the second timer 417. Further, the controller 401 may identify whether a TCP data segment having an omitted sequence number is received for a pre-designated time (e.g. setting time of the second timer 417), in order to identify whether the TCP data segment having the omitted sequence number has been permanently lost in process of transmission.

If the TCP data segment having the omitted sequence number is received for the pre-designated time (e.g. setting time of the second timer 417), the controller 401 may stop an operation of the second timer 417 which has been set in relation to the corresponding TCP data segment.

If the second timer 417 expires, the controller 401 may transit from the second state 507 to the fourth state 511. In the fourth state 511, the controller 401 may perform one of a plurality of options.

According to a first option, the controller 401 may notify an upper layer of an error together with data stored in a reception buffer. The upper layer, which has been notified of the error, may re-receive the retransmission of a TCP data segment corresponding to the omitted sequence number through a mechanism of the upper layer (e.g. HTTP 1.1 Byte Range Request). According to a second option, the controller 401 may generate any bit sequence, replace the TCP data segment corresponding to the omitted sequence number by the generated bit sequence, and output the bit sequence to the upper layer. The second option can be used when an upper application using a TCP, like a video streaming player, does not provide a large difference to a user even though data loss or data transformation is generated.

If a TCP data segment is not received up to when the first timer 415 expires, the controller 401 may transit from the second state 507 to the third state 509. Further, in the third state 509, the controller 401 may generate and transmit the following optimistic TCP ACK message, and reset the first timer 415. When a TCP data segment is not received after a pre-designated time (e.g., time set in the first timer 415), the controller 401 may generate and transmit the following optimistic TCP ACK message.

Further, in the standby and second and third states 505, 507, and 509, the controller 401 may calculate, on the basis of information on the bandwidth of the RAT2, a target data transmission rate and calculate an actual data transmission rate which is changed during the reception of TCP data. Further, the controller 401 may compare the target data transmission rate with the actual data transmission rate. If the actual data transmission rate is equal to or higher than the target data transmission rate, the controller 401 may proceed to the fourth state 511. On the contrary, if the actual data transmission rate is lower than the target data transmission rate, the controller 401 may remain in corresponding one of the standby and second and third states 505, 507, and 509.

If the controller 401 proceeds to the fourth state 511, the controller 401 may end the first timer 415 and proceed to an end state 515. Further, in the end state 515, the controller 401 may end the scheme of increasing a TCP data transmission rate.

Meanwhile, the server 100 may receive, by receiving an optimistic TCP ACK message, the corresponding TCP ACK segment as soon as a TCP data segment is transmitted as if the UE 110 exists in a short RTT interval. Therefore, the server 100 may increase the size of a CWND on the basis of Equation 2 below whenever an optimistic TCP ACK segment is received.

Slow Start State: CWND+=MIN($N$,MSS)

Congestion Avoidance State: CWND+=MSS*MSS/CWND  [Equation 2]

In Equation 2, N indicates the number of bytes of the amount of data allowable in the UE newly notified of by an optimistic TCP ACK segment and CWND indicates the size of a congestion window. Further, MSS indicates the maximum segment size per RTT and MIN indicates the minimum segment size per RTT.

Figure 6:
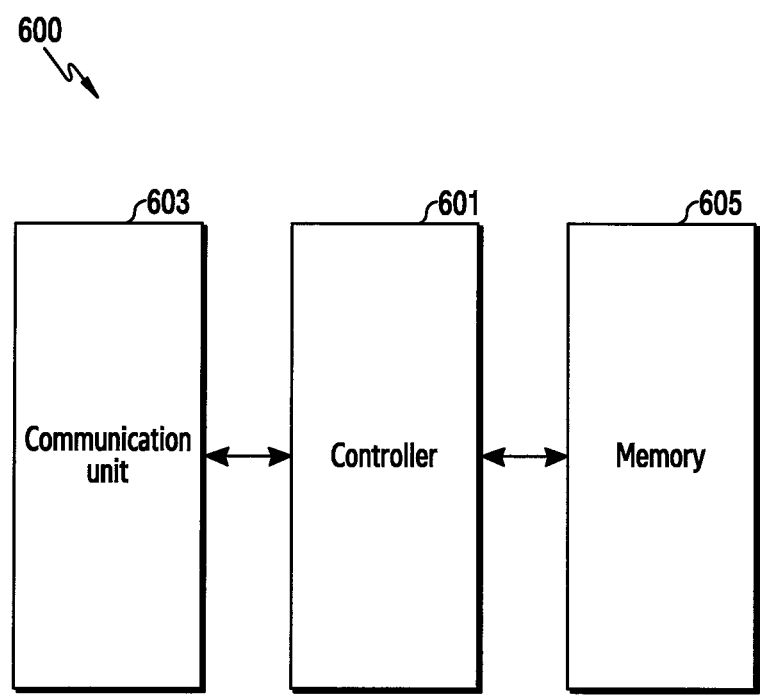
FIG. 6 illustrates block diagram of a server according to various embodiments of the present disclosure.

FIG. 6 illustrates block diagram of a server 600 according to various embodiments of the present disclosure.

Referring to FIG. 6, the server 600 may include a controller 601, a communication unit 603, and a memory 605. According to an embodiment, the server 600 may be the server 100 or a TCP proxy server.

Examining respective elements, the communication unit 603 may provide an interface for wiredly or wirelessly communicating with other nodes in a network. For example, when the server 600 is the server 100, the communication unit 603 may communicate the UE 110 or the eNB1 120 through the GW 140. As another example, when the server 600 is a TCP proxy server, the communication unit 603 may communicate the UE 110, the eNB1 120, or the server 100 through the GW 140.

The memory 605 stores data, such as default programs, an application programs, and setting information, for an operation of the server 600 (e.g. the server 100 or TCP proxy server). For example, in order to transmit data corresponding to a request of the UE 110, the memory 605 may store the corresponding data. For example, when the server 600 is the server 100, the memory 605 may store a TCP ACK segment or an optimistic TCP ACK segment, received from the UE 110 or the eNB1 120. For example, the TCP ACK segment may include an RWND indicating the amount of data which can be received by the UE 110. For example, the optimistic TCP ACK segment may be a TCP ACK segment which is transmitted before the UE 110 receives a TCP data segment, optimistically assuming that the corresponding TCP data segment is successfully received.

As another example, when the server 600 is a TCP proxy server, the memory 605 may store a TCP transmission rate instruction message received from the eNB1 120. For example, the TCP transmission rate instruction message may include information on the bandwidth of an RAT (e.g. RAT1 or RAT2) into which the UE 110 is expected to perform or has perform an access change. For example, the information on the bandwidth of the RAT may include the bandwidth of the corresponding RAT or a data transmission rate which the UE 110 wants.

The controller 601 controls general operations of the server 600 (e.g. server 100 or TCP proxy server). For example, the controller 601 may transmit or receive a signal through the communication unit 603. Further, the controller 601 may record or read data in the memory 605.

According to an embodiment, when the server 600 is the server 100, the controller 601 transmits a TCP data segment to the UE 110. Further, the controller 601 receives a TCP ACK segment or an optimistic TCP ACK segment. Further, the controller 601 may determine the size of a CWND on the basis of the received TCP ACK segment or optimistic TCP ACK segment. For example, the controller 601 may analyze the received TCP ACK segment so as to detect an RWND and may decrease the size of a CWND on the basis of the detected RWND. As another example, the controller 601 may calculate an RTT on the basis of a transmission time point of the TCP data segment and a reception time point of the optimistic TCP ACK segment and may increase the size of a CWND on the basis of the calculated RTT.

Further, the controller 601 may transmit TCP data according to the determined size of CWND. For example, the controller 601 may decrease a transmission rate according to the decreased size of a CWND and then transmit TCP data. As another example, the controller 601 may increase a transmission rate according to the increased size of a CWND and then transmit TCP data.

According to another embodiment, when the server 600 is a TCP proxy server, the controller 601 may receive a TCP data segment from the server 100 and transmit the received TCP data segment to the UE 110. Further, the controller 601 may receive a TCP transmission rate instruction message from the eNB1 120. Further, the controller 601 may determine the size of a CWND on the basis of the received TCP transmission rate instruction message. For example, the controller 601 may increase or decrease the CWND size of the server 100 on the basis of RAT bandwidth information included in the TCP transmission rate instruction message. Further, the controller 601 may transmit a TCP data segment to the UE 110 according to the determined size of a CWND. For example, the controller 601 may receive a TCP data segment from the server 100 at a transmission rate according to the determined size of a CWND and transmit the received TCP data segment to the UE 110.

Figure 7:
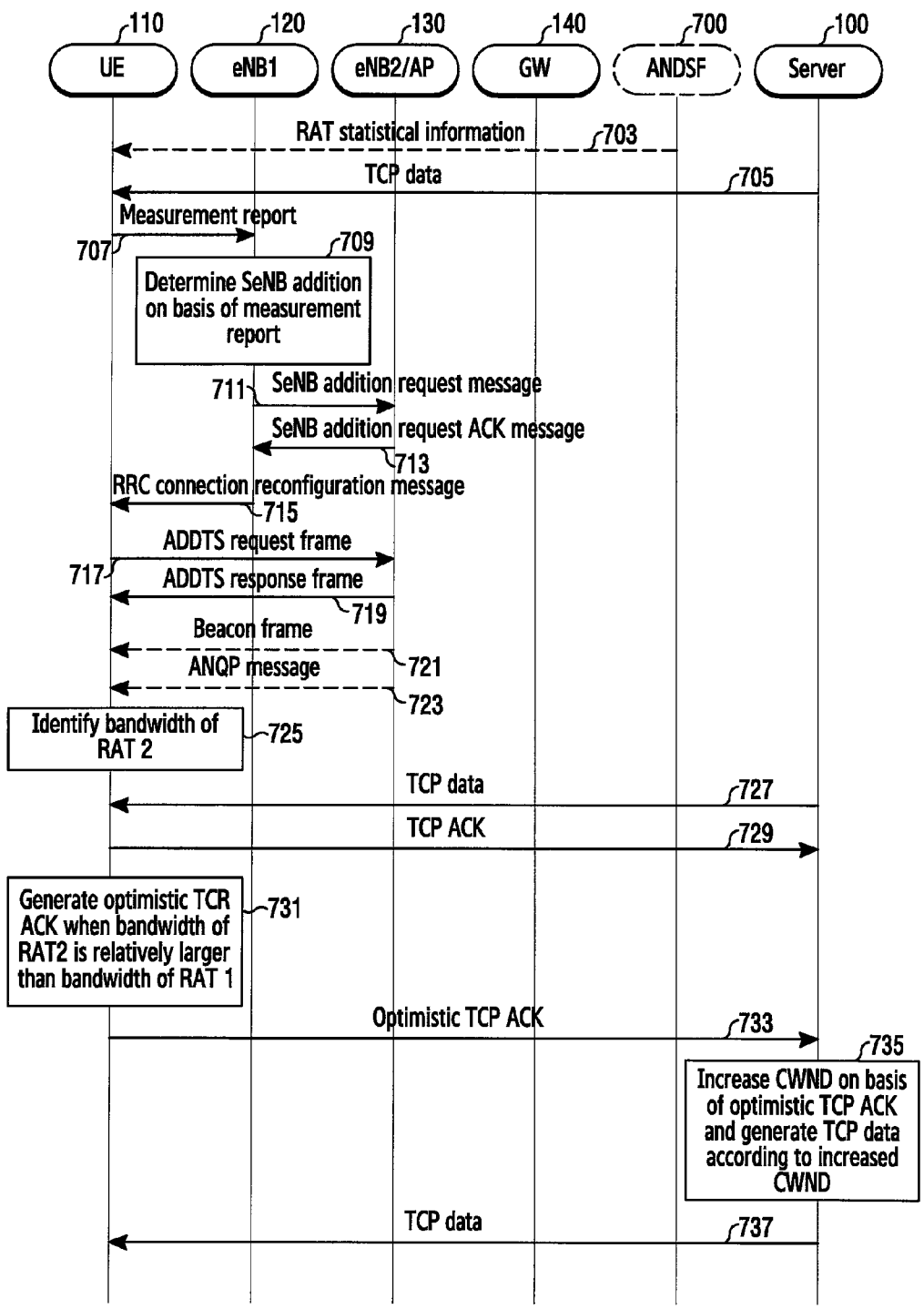
FIG. 7 illustrates a flow chart of transmitting and receiving Transmission Control Protocol (TCP) data according to an access change from a first Radio Access Technology (RAT1) to a second RAT (RAT2) in a communication system of a first embodiment of the present disclosure.

FIG. 7 illustrates a flow chart of transmitting and receiving Transmission Control Protocol (TCP) data according to an access change from a first Radio Access Technology (RAT1) to a second RAT (RAT2) in a communication system of a first embodiment of the present disclosure. For a brief description of the present disclosure, it is assumed that the bandwidth of the RAT2 is several times to several hundreds of times wider than the bandwidth of the RAT1 120. Further, it is assumed that the UE 110 changes access from the eNB1 120 using the RAT1 to the eNB2 130 using the RAT2 while communicating with the server 100 according to a TCP.

Referring to FIG. 7, in step 705, the server 100 may transmit TCP data (e.g. TCP data segment) to the UE 110 through the GW 140 and the eNB1 120.

In step 707, the UE 110 may transmit a measurement report to the eNB1 120.

Herein, the measurement report may include signal intensity information related to at least one neighboring RAT. For example, the UE 110 may transmit the measurement report to the eNB1 120, periodically or when a particular condition is satisfied. Herein, the particular condition may be a case where the UE 110 has determined an access change or a case where the UE has received a transmission request from the eNB1 120.

In step 709, the eNB1 120 may determine to add, as an SeNB, one of one or more RATs adjacent to the UE 110, on the basis of the received measurement report. For example, the eNB1 120 may determine, as an SeNB, an eNB having larger signal intensity than a pre-designated reference value among one or more eNBs. For example, the eNB1 120 may determine the eNB2 130 as an SeNB.

In step 711, the eNB1 120 may transmit an SeNB addition request message to the eNB2 130, which is determined as an SeNB. For example, the SeNB addition request message may include identifier information of the UE 110, data traffic capacity which is being used by the UE 110, and the like. In step 713, the eNB2 130 may transmit an SeNB addition request ACK message in response to the SeNB addition request message. For example, the SeNB addition request ACK message may include identifier information of the UE 110, information indicating whether to receive data traffic capacity which is being used by the UE 110, and a parameter required when the UE 110 accesses the eNB2 130. For example, the parameter may include information on the bandwidth of the RAT2 related to the eNB2 130.

In step 715, the eNB1 120 may transmit, to the UE 110, an RRC connection reconfiguration message. For example, the RRC connection reconfiguration message may be a message which instructs the UE 110 to set a connection with the eNB2 130. For example, the RRC connection reconfiguration message may include information on the bandwidth of the RAT2 related to the eNB2 130.

When the RRC connection reconfiguration message is received, the UE 110 may set a connection with a node (e.g. eNB2 or AP 130) using the RAT2 and receive, from the corresponding node, information on a bandwidth to be allocated to the UE 110.

According to an embodiment, when the corresponding node is a wireless LAN AP according to the IEEE 802.11 standard, the UE 110 may acquire the information on a bandwidth to be allocated thereto in process of setting a traffic stream (TS) with the wireless LAN AP.

For example, in step 717, the UE 110 may transmit an add traffic stream (ADDTS) request frame to the AP 130. Further, in step 719, the AP 130 may transmit an ADDTS response frame in response the ADDTS request frame. For example, the ADDTS response frame may include TSPEC that is a standard of a traffic which the AP 130 ensures for the UE 110. Herein, the TSPEC may include a minimum data rate, a mean data rate, and a maximum data rate.

If the AP 130 does not support a TS setting function or refuses TS setting, the AP 130 may transmit a beacon frame in step 721. For example, the beacon frame may include a wireless LAN channel load measured in the AP 130, a transmission rate supported by the AP 130, a protocol version (e.g. HT Capability, VHT Capability, DMG Capability) supported by the AP 130, and the like.

Further, when the AP 130 supports Hotspot 2.0 of WFA, the UE 110 may transmit an ANQP query message, which requests information on an external network, to the AP 130 and the AP 130 may transmit, to the UE 110, an ANQP response message including the information on the external network. For example, the information on the external network may be WAN Metric transmitted from the AP 130 to an external Internet.

When the corresponding node cannot provide the information on bandwidth of the RAT2 to the UE 110, the UE 110 may receive the information on bandwidth of the RAT2 related to the corresponding node from separate equipment (e.g. an ANDSF server 700) of a mobile network operator. For example, as in step 703, the ANDSF server 700 may transmit, to the UE 110, statistical information including information on the bandwidth of the RAT1 of the eNB1 120 and information on bandwidth of the RAT2 of the eNB2 130, periodically or according to an event. For example, the statistical information may include statistics of bandwidth information of RATs according to a time, location, or radio condition.

In step 725, the UE 110 may identify the bandwidth of the RAT2 on the basis of the received information on bandwidth of the RAT2. For example, when the corresponding node 130 is an AP, the UE 110 may receive, from the AP, at least one among an ADDTS response frame, a beacon frame, and an ANQP response message in steps 719 to 723. Further, the UE 110 may identify bandwidth of the RAT2 on the basis of information included in at least one among the ADDTS response frame, the beacon frame, and the ANQP response message.

For example, the UE 110 may estimate a bandwidth of the RAT2 on the basis of the minimum data rate, mean data rate, and maximum data rate which are included in the ADDTS response frame. As another example, the UE 110 may estimate the bandwidth of the RAT2 on the basis of a transmission rate which can be supported by the AP and is included in the beacon frame. As still another example, the UE 110 may estimate the bandwidth of the RAT2 on the basis of WAN Metric included in the ANQP response message.

As another example, in step 703, the UE 110 may estimate the bandwidth of the RAT2 on the basis of statistics of information on the bandwidths of RATs, included in the statistical information received from the ANDSF server 700. As another example, in step 715, the UE 110 may estimate the bandwidth of the RAT2 on the basis information on the bandwidths of RAT2, included in the RRC connection reconfiguration message received from the eNB1 120.

In step 727, the server 100 may transmit a TCP data segment to the UE 110. In step 729, the UE 110 may transmit a TCP ACK segment related to the received TCP data. Further, in step 731, when bandwidth of the RAT2 is several times to several hundreds of times wider than the bandwidth of the RAT1, the UE 110 may generate an optimistic TCP ACK segment. For example, the UE 110 may generate an optimistic TCP ACK segment according to the scheme of increasing a TCP data transmission rate, described in FIG. 5. Herein, the optimistic TCP ACK segment is a TCP ACK segment which is transmitted before the UE 110 receives a TCP data segment, optimistically assuming that the TCP data segment is successfully received.

In step 733, the UE 110 may transmit the generated optimistic TCP ACK segment to the server 100. In step 735, the server 100 may increase the size of a CWND on the basis of the received optimistic TCP ACK segment and generate TCP data according to the increased size of the CWND. For example, the server 100 may calculate an RTT between the received optimistic TCP ACK segment and a TCP data segment corresponding thereto and may increase the size of a CWND on the basis of the calculated RTT. For example, the server 100 may determine CWND by using Equation 2.

In step 737, the server 100 may generate the following TCP data segment according to the increased size of the CWND and transmit the generated successive TCP data segment to the UE 110.

According to an embodiment, a communication system repeats steps 729 to 737 until the TCP data transmission rate matches bandwidth of the RAT2.

As described above, in the first embodiment, when the server 100 increases a TCP data transmission rate on the basis of the optimistic TCP ACK message received from the UE 110, the UE 110 may receive TCP data at a transmission rate suitable for bandwidth of the RAT2 of the eNB2 130.

Figure 8:
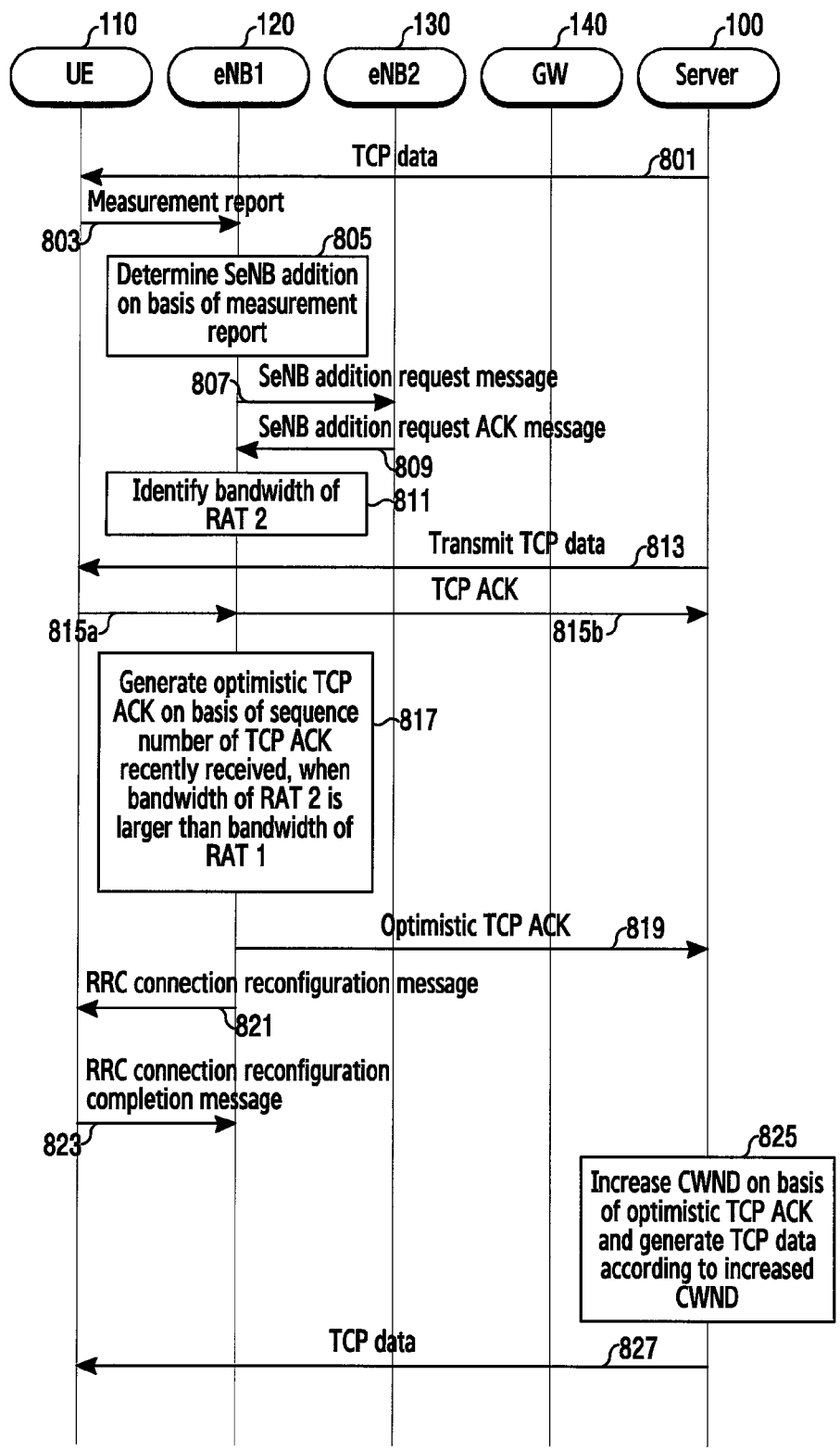
FIG. 8 illustrates a flow chart of transmitting and receiving TCP data according to an access change from an RAT1 to an RAT2 in a communication system of a second embodiment of the present disclosure.

FIG. 8 illustrates a flow chart of transmitting and receiving TCP data according to an access change from an RAT1 to an RAT2 in a communication system of a second embodiment of the present disclosure. For a brief description of the present disclosure, it is assumed that the bandwidth of the RAT2 is several times to several hundreds of times wider than the bandwidth of the RAT1. Further, it is assumed that the UE 110 changes access from the eNB1 120 using the RAT1 to the RAT2 130 while communicating with the server 100 according to a TCP.

In FIG. 8, steps 801 to 809 correspond to steps 705 to 713 in FIG. 7, respectively. Therefore, a description will be omitted of steps 801 to 809 and will be made from step 811.

In step 811, the eNB1 120 may identify the bandwidth of the RAT2 on the basis of information on bandwidth of the RAT2 related to the eNB2 130. For example, the eNB1 120 may identify bandwidth of the RAT2 by using an SeNB addition request ACK message received in step 809. For example, the SeNB addition request ACK message may include a parameter required when the UE 110 accesses the eNB2 130. For example, the parameter may include information on the bandwidth of the RAT2.

As another example, when the eNB1 120 is connected to the eNB2 130 through a backhaul network, the eNB1 120 may receive information on bandwidth of the RAT2 by using the backhaul network and identify the bandwidth of the RAT2 on the basis of the received information on the bandwidth of the RAT2.

In step 813, the server 100 may transmit a TCP data segment to the UE 110 and, in step 815a, the eNB1 120 may receive a TCP ACK segment from the UE 110 and transmit (in step 815b) the received TCP ACK segment to the server 100. In step 817, when the bandwidth of the RAT2 is wider than the bandwidth of the RAT1, the eNB1 120 may generate an optimistic TCP ACK segment on the basis of a sequence number of an TCP ACK segment which has been recently received from the UE 110. For example, the eNB1 120 may generate an optimistic TCP ACK segment according to the scheme of increasing a TCP data transmission rate, described in FIG. 5.

In step 819, the eNB1 120 may transmit the generated optimistic TCP ACK segment to the server 100 and may transmit, in step 821, an RRC connection reconfiguration message to the UE 110. For example, the RRC connection reconfiguration message may be a message which instructs the UE 110 to set a connection with the eNB2 130. In step 823, the UE 110 may complete the connection with the eNB2 130 and transmit an RRC connection reconfiguration completion message to the eNB1 120.

In step 825, the server 100 may increase the size of a CWND on the basis of the received optimistic TCP ACK segment and generate TCP data according to the increased size of the CWND. For example, the server 100 may calculate an RTT between the received optimistic TCP ACK segment and a TCP data segment corresponding thereto and may increase the size of a CWND on the basis of the calculated RTT. For example, the UE 110 may determine CWND by using Equation 2.

In step 827, the server 100 may generate the following TCP data segment according to the increased size of the CWND and transmit the generated successive TCP data segment to the UE 110.

According to an embodiment, a communication system repeats steps 817 to 827 until the TCP data transmission rate matches the bandwidth of the RAT2.

As described above, in the second embodiment, when the server 100 increases a TCP data transmission rate on the basis of the optimistic TCP ACK message received from the eNB1 120, the UE 110 may receive TCP data at a transmission rate suitable for the bandwidth of the RAT2.

Figure 9:
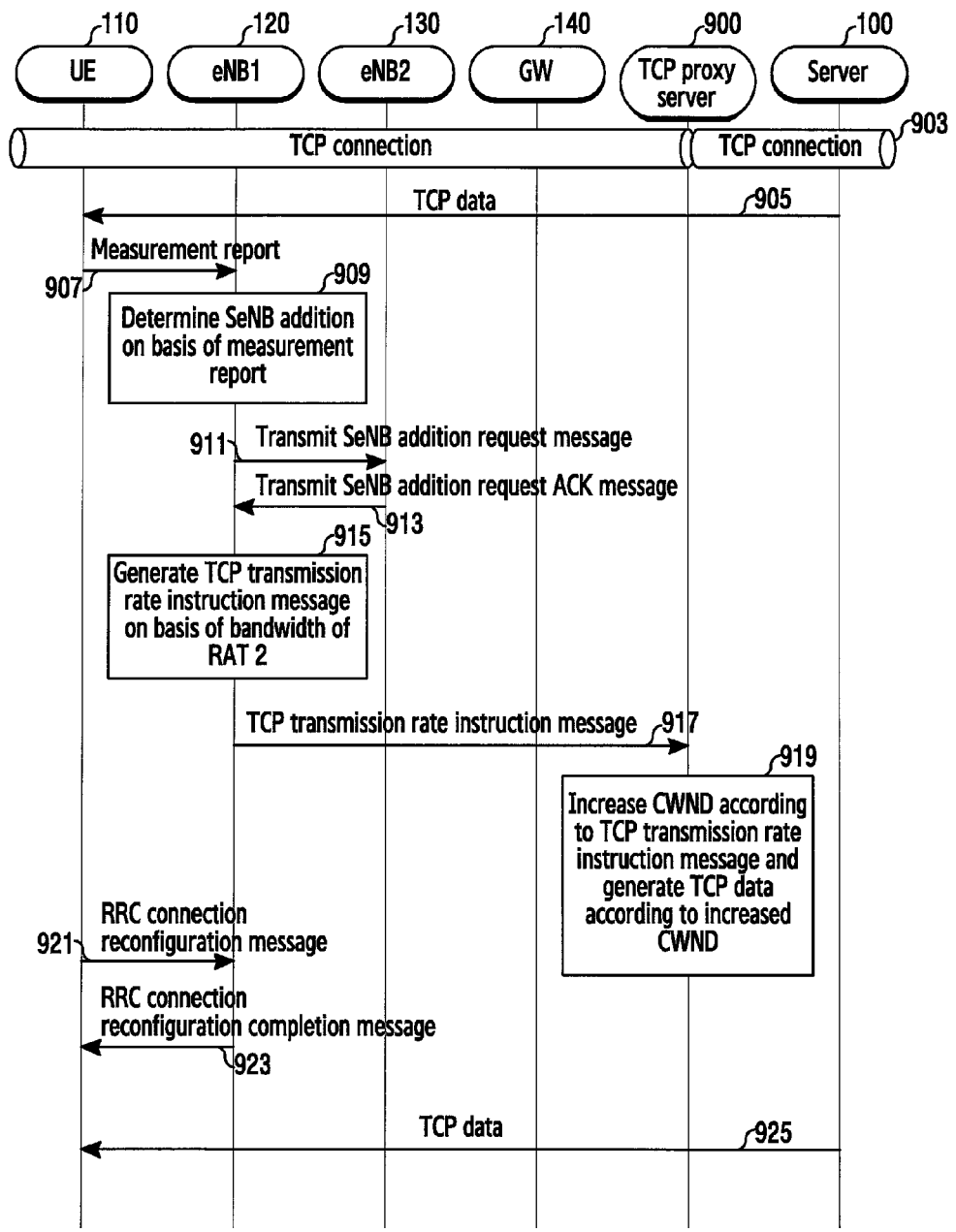
FIG. 9 illustrates a flow chart of transmitting and receiving TCP data according to an access change from an RAT1 to an RAT2 in a communication system of a third embodiment of the present disclosure.

FIG. 9 illustrates a flow chart of transmitting and receiving TCP data according to an access change from an RAT1 to an RAT2 in a communication system of a third embodiment of the present disclosure. For a brief description of the present disclosure, it is assumed that the bandwidth of the RAT2 is several times to several hundreds of times wider than the bandwidth of the RAT1 120. Further, it is assumed that the UE 110 changes access from the RAT1 120 to the RAT2 130 while communicating with the server 100 according to a TCP.

Further, it is assumed that a TCP proxy server 900 is included in a communication system. For example, the TCP proxy server 900 may be a server installed by a mobile network operator in order to enhance the TCP performance of a network subscriber. The mobile network operator may transmit or receive, between the TCP proxy server 900 and the server 100, a signal (out-of-band signal) defined by a separate signaling protocol.

Therefore, a TCP connection between the UE 110 and the server 100 is segmented into a TCP connection between the UE 110 and the TCP proxy server 900 and a TCP connection between the TCP proxy server 900 and the server 100.

Referring to FIG. 9, in step 903, the UE 110 may perform a TCP connection with the server 100 through the TCP proxy server 900.

Meanwhile, steps 905 to 913 correspond to steps 705 to 713 in FIG. 7, respectively. Therefore, a description will be omitted of steps 905 to 913 and will be made from step 915.

In step 915, the eNB1 120 may identify the bandwidth of the RAT2 130 and generate a TCP transmission rate instruction message on the basis of the identified bandwidth of the RAT2. Herein, the TCP transmission rate instruction message may be a message which instructs the server 100 to control the transmission rate of TCP data. For example, the TCP transmission rate instruction message may include information on the bandwidth of the RAT2. For example, the information on the bandwidth of the RAT2 may include the bandwidth of the second RAT or a TCP data transmission rate (e.g. 100 Mbps) which the UE 110 wants. In step 917, the eNB1 120 may transmit the TCP transmission rate instruction message to the TCP proxy server 900 through an out-of-band signal (signaling).

In step 919, the eNB1 120 may transmit, to the UE 110, an RRC connection reconfiguration message. For example, the RRC connection reconfiguration message may be a message which instructs the UE 110 to set a connection with the eNB2 130. In step 921, the UE 110 may complete the connection with the eNB2 130 and transmit an RRC connection reconfiguration completion message to the eNB1 120.

In step 923, the TCP proxy server 900 may increase the size of a CWND on the basis of the information on the bandwidth of the RAT2, included in the TCP transmission rate instruction message and may generate TCP data according to the increased size of the CWND. In step 925, the TCP proxy server 900 may transmit the generated TCP data segment to the UE 110.

As described above, in the third embodiment, when the TCP proxy server 900 increases a TCP data transmission rate on the basis of the TCP transmission rate instruction message received from the eNB1 120, the UE 110 may receive TCP data at a transmission rate suitable for the bandwidth of the RAT2 130.

Figure 10:
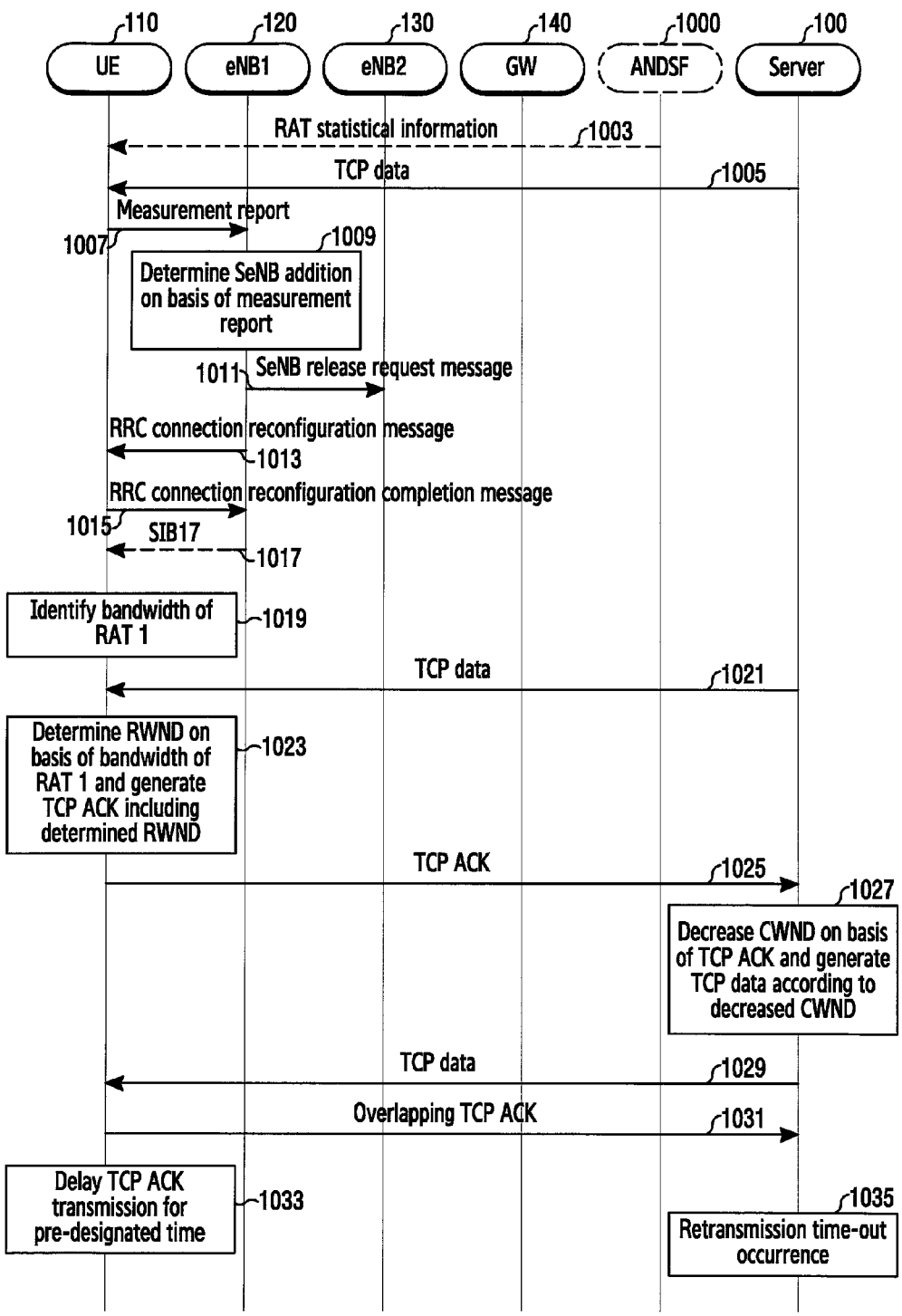
FIG. 10 illustrates a flow chart of transmitting and receiving TCP data according to an access change from an RAT2 to an RAT1 in a communication system of a first embodiment of the present disclosure.

FIG. 10 illustrates a flow chart of transmitting and receiving TCP data according to an access change from an RAT2 to an RAT1 in a communication system of a first embodiment of the present disclosure. For a brief description of the present disclosure, it is assumed that the bandwidth of the RAT2 is several times to several hundreds of times wider than the bandwidth of the RAT1. Further, it is assumed that the UE 110 changes access from the eNB2 130 using the RAT2 to the eNB1 120 using the RAT1 while communicating with the server 100 according to a TCP.

In FIG. 10, steps 1003 to 1007 correspond to steps 703 to 707 in FIG. 7, respectively. Therefore, a description will be omitted of steps 1003 to 1007 and will be made from step 1009.

In step 1009, the eNB1 120 may determine to release an SeNB on the basis of a received measurement report. For example, when the eNB2, which is an SeNB, has signal intensity lower than a pre-designated reference value, the eNB1 120 may determine to release an SeNB for the UE 110. In step 1011, the eNB1 120 may transmit to the eNB2 130, an SeNB release request message. Herein, the SeNB release request message may be a message which requests the eNB2 130 to release a connection with the UE 110. For example, the SeNB release request message may include identifier information of the UE 110.

In step 1013, the eNB1 120 may transmit, to the UE 110, an RRC connection reconfiguration message. For example, the RRC connection reconfiguration message may be a message which instructs the UE 110 to release a connection with the eNB2 130. For example, the RRC connection reconfiguration message may include RAT1 bandwidth information to be provided to the UE 110.

In step 1015, the UE 110 may complete the release of a connection with the eNB2 130 and transmit an RRC connection reconfiguration completion message to the eNB1 120. In step 1019, the UE 110 may identify the bandwidth of the first RAT 120. For example, the UE 110 may estimate the bandwidth of the RAT1 by using the RRC connection reconfiguration message received in step 1013.

If the RAT1 bandwidth information cannot be provided in step 1013, the UE 110 may estimate the bandwidth of the RAT1 by using statistical information received from an ANDSF server 1000 in step 1003. Herein, the statistical information may include bandwidth related information related to at least one eNB or AP.

In step 1017, when the eNB1 120 is a base station which supports a function defined in 3GPP Rel-12, the UE 110 may receive a system information block (SIB) 17 (e.g. operator preference indicator (OPI) field). The OPI is a 16-bit bitmap (e.g. one-dimensional bit array) which can be used when a terminal within E-UTRA or UTRA determines when a particular traffic (e.g. particular IP flow) moves to WLAN access or 3GPP access. The OPI field may include an intra-operator eNB (e.g. load of eNB1 120) information. Therefore, the UE 110 may accurately estimate the bandwidth of the RAT1 by using the statistical information and the load information.

In step 1021, the server 100 may transmit a TCP data segment. In step 1023, the UE 110 may determine the size of an RWND on the basis of the identified bandwidth of the RAT1 and generate a TCP ACK segment including the determined size of the RWND. For example, the UE 110 may determine the size of an RWND by using Equation 1. For example, the size of the RWND may be included in a window field of the TCP ACK segment. In step 1025, the UE 110 may transmit the generated TCP ACK segment to the server 100.

In step 1027, the server 100 may decrease the size of a CWND on the basis of the received TCP ACK segment, generate a TCP data segment according to the decreased CWND, and transmit the generated TCP data segment to the UE 110 in step 1029.

Meanwhile, in spite of a TCP data transmission rate decrease control using the TCP ACK segment, the loss of many TCP data segments may occur in progress of an access change. In order to these losses, the steps as described below may be additionally performed.

In step 1031, the UE 110 may transmit, to the server 100, overlapping TCP ACK segments with respect to one TCP data segment. In step 1033, when the overlapping TCP ACK segments have been successively transmitted (e.g. at least two), the UE 110 may delay TCP ACK segment transmission for a pre-designated time (e.g. one second). In step 1033, the server 100 may sense the delay of the TCP ACK segment transmission and generate a retransmission time-out (RTO).

In step 1031, the server 100 may receive three or more overlapping TCP ACK segments to prevent Fast Retransmit and Fast Recovery from being performed. In steps 1031 and 1033, in order to recover the loss of many TCP data segments, retransmission by Fast Recovery of a TCP may be selectively performed in an environment in which the retransmission by the Fast Recovery is performed more slowly than the retransmission by an RTO.

As described above, in the first embodiment, when the server 100 decreases a TCP data transmission rate on the basis of the TCP ACK message received from the UE 110, the UE 110 may receive TCP data at a transmission rate suitable for bandwidth of the RAT1.

Figure 11:
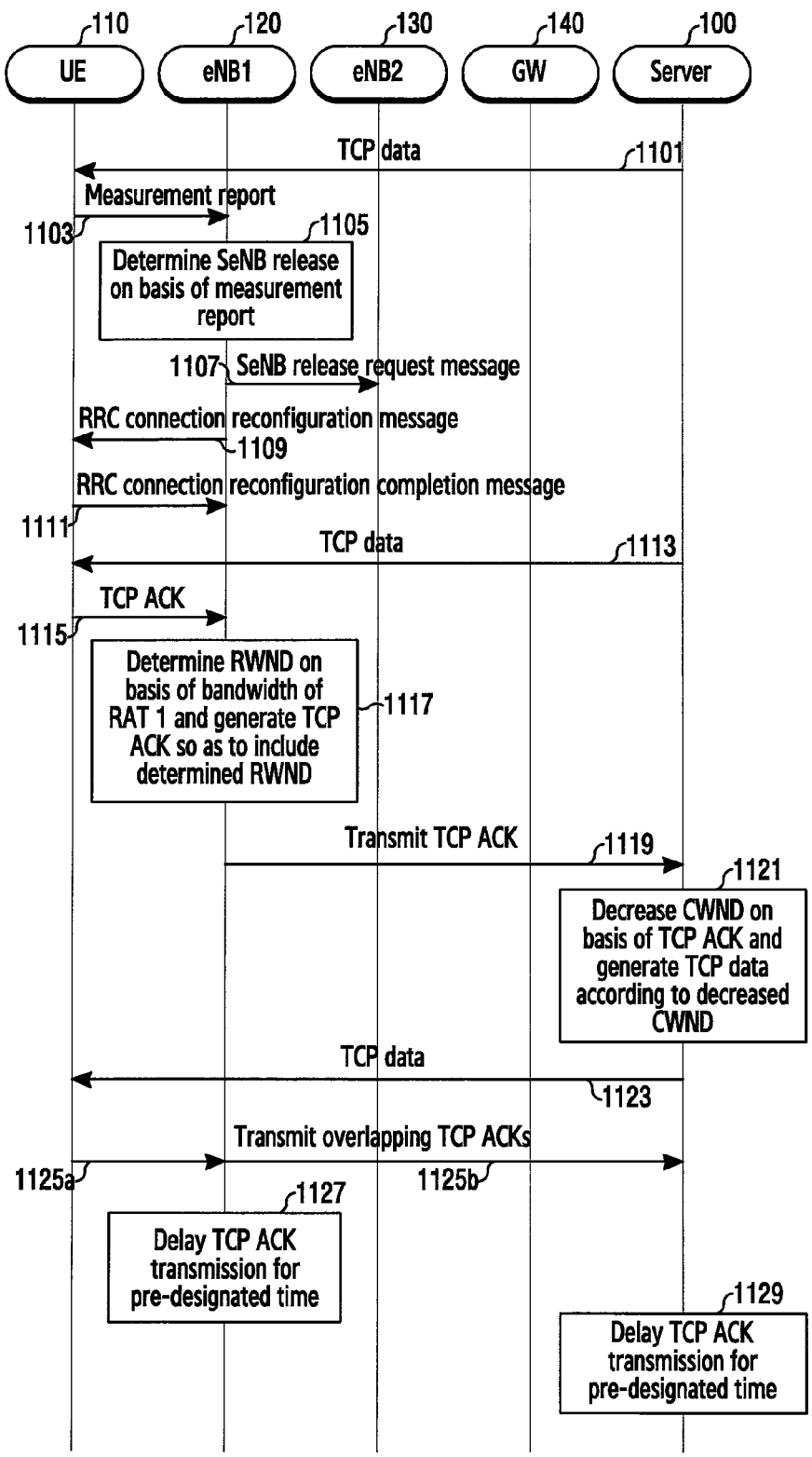
FIG. 11 illustrates a flow chart of transmitting and receiving TCP data according to an access change from an RAT2 to an RAT1 in a communication system of a second embodiment of the present disclosure.

FIG. 11 illustrates a flow chart of transmitting and receiving TCP data according to an access change from an RAT2 to an RAT1 in a communication system of a second embodiment of the present disclosure. For a brief description of the present disclosure, it is assumed that the bandwidth of the RAT2 is several times to several hundreds of times wider than the bandwidth of the RAT1. Further, it is assumed that the UE 110 changes access from the eNB2 130 to the eNB1 120 while communicating with the server 100 according to a TCP.

In FIG. 11, steps 1101 to 1113 correspond to steps 1005 to 1015 and 1021 in FIG. 10, respectively. Therefore, a description will be omitted of steps 1101 to 1113 and will be made from step 1115.

In step 1115, the eNB1 120 may receive, from the UE 110, a TCP ACK segment corresponding to a TCP data segment. In step 1117, the eNB1 120 may determine the size of an RWND related to the UE 110 on the basis of the bandwidth of the RAT1 and change the TCP ACK segment so that the TCP ACK segment includes the determined size of the RWND. For example, the eNB1 120 may determine RWND by using Equation 1 below. For example, the determined RWND may be included in a window field of the TCP ACK segment. In step 1117, the eNB1 120 may transmit the changed TCP ACK segment to the server 100.

Steps 1121 to 1129 in FIG. 11 correspond to steps 1027 to 1035 in FIG. 10, respectively, and therefore description of steps 1121 to 1129 will be omitted. In steps 1125a-1125b, the UE 110 may transmit, to the server 100, overlapping TCP ACK segments with respect to one TCP data segment. In step 1125a, the UE 110 may transmit the overlapping TCP ACK segments with respect to one TCP data segment to the eNB1 120. In step 1125b, the eNB1 120 may receive the overlapping TCP ACK segments with respect to one TCP data segment from the UE 110 and transmit the received the overlapping TCP ACK segments with respect to one TCP data segment to the server 100.

As described above, in the second embodiment, when the server 100 decreases a TCP data transmission rate on the basis of the TCP ACK data received from the eNB1 120, the UE 110 may receive TCP data at a transmission rate suitable for the bandwidth of the RAT1.

Figure 12:
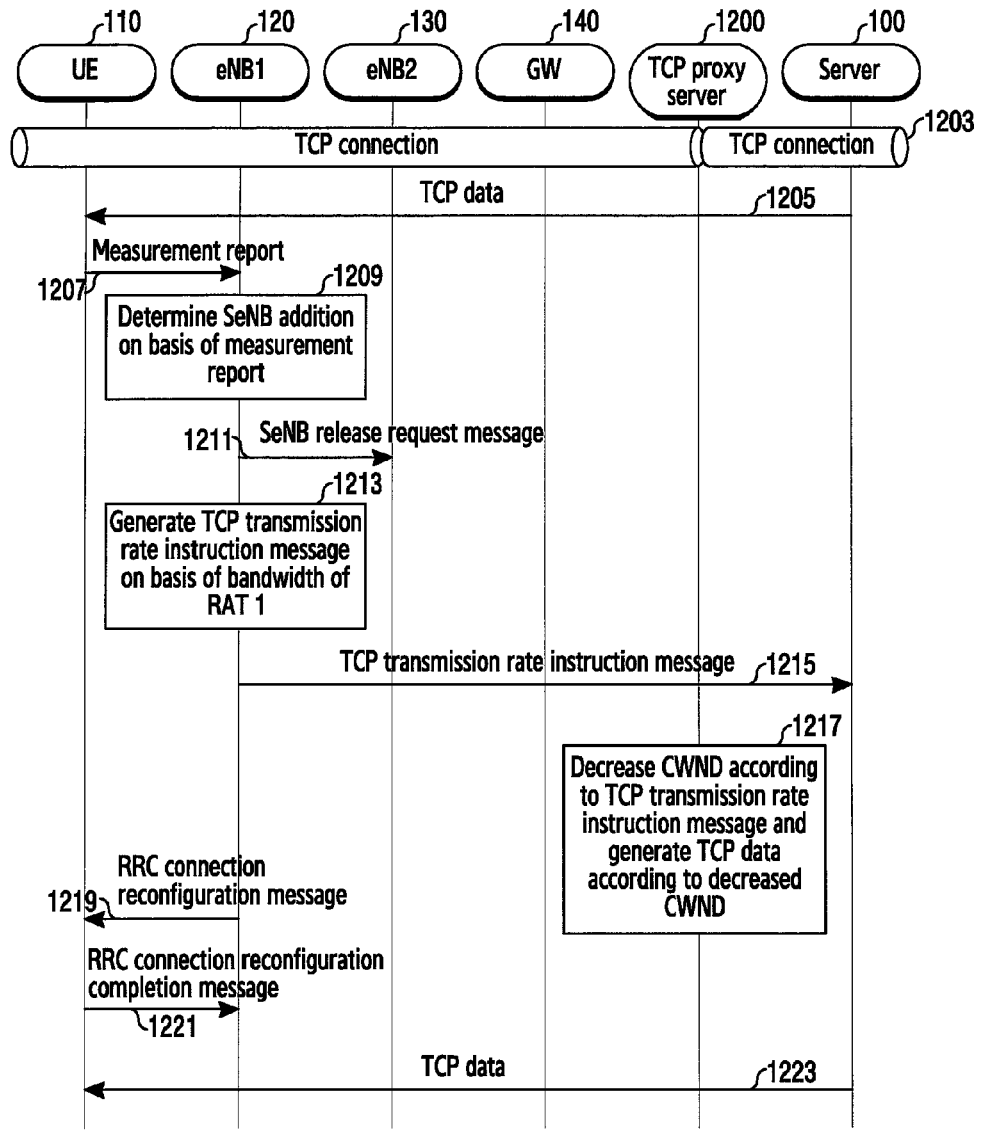
FIG. 12 illustrates a flow chart of transmitting and receiving TCP data according to an access change from an RAT2 to an RAT1 in a communication system of a third embodiment of the present disclosure.

FIG. 12 illustrates a flow chart of transmitting and receiving TCP data according to an access change from an RAT2 to an RAT1 in a communication system of a third embodiment of the present disclosure. For a brief description of the present disclosure, it is assumed that the bandwidth of the RAT2 is several times to several hundreds of times wider than the bandwidth of the RAT1. Further, it is assumed that the UE 110 changes access from the eNB2 130 using the RAT2 to the eNB1 120 using the RAT1 while communicate with the server 100 according to a TCP.

Further, it is assumed that a TCP proxy server 1200 is included in a communication system. Therefore, a TCP connection between the UE 110 and the server 100 is segmented into a TCP connection between the UE 110 and the TCP proxy server 1200 and a TCP connection between the TCP proxy server 1200 and the server 100.

Referring to FIG. 12, in step 1203, the UE 110 may perform a TCP connection with the server 100 through the TCP proxy server 1200.

Steps 1205 to 1211 correspond to steps 905 to 911 in FIG. 9, respectively. Therefore, a description will be omitted of steps 1205 to 1211 and will be made from step 1213.

In step 1213, the eNB1 120 may identify the bandwidth of the RAT1 which is an RAT of the eNB1 120 and generate a TCP transmission rate instruction message on the basis of the identified bandwidth of the RAT1. Herein, the TCP transmission rate instruction message may be a message which instructs the server 100 to control the transmission rate of TCP data. For example, the TCP transmission rate instruction message may include information on the bandwidth of the RAT1. For example, the information on the bandwidth of the RAT1 may include the bandwidth of the RAT1 or a TCP data transmission rate (e.g. 10 Mbps) which the UE 110 wants. In step 1215, the eNB1 120 may transmit the TCP transmission rate instruction message to the TCP proxy server 1200 through an out-of-band signal (signaling).

In step 1217, the eNB1 120 may transmit, to the UE 110, an RRC connection reconfiguration message. For example, the RRC connection reconfiguration message may be a message which instructs the UE 110 to release a connection with the eNB2 130. In step 1219, the UE 110 may complete the release of a connection with the eNB2 130 and transmit an RRC connection reconfiguration completion message to the eNB1 120.

In step 1221, the TCP proxy server 1200 may decrease the size of a CWND on the basis of the information on the bandwidth of the RAT1, included in the TCP transmission rate instruction message, and may generate a TCP data segment according to the decreased size of the CWND. In step 1223, the TCP proxy server 1200 may transmit the generated TCP data segment to the UE 110.

As described above, in the third embodiment, when the TCP proxy server 1200 increases a TCP data transmission rate on the basis of the TCP transmission rate instruction message received from the eNB1 120, the UE 110 may receive TCP data at a transmission rate suitable for the bandwidth of the RAT1 120.

Figure 13:
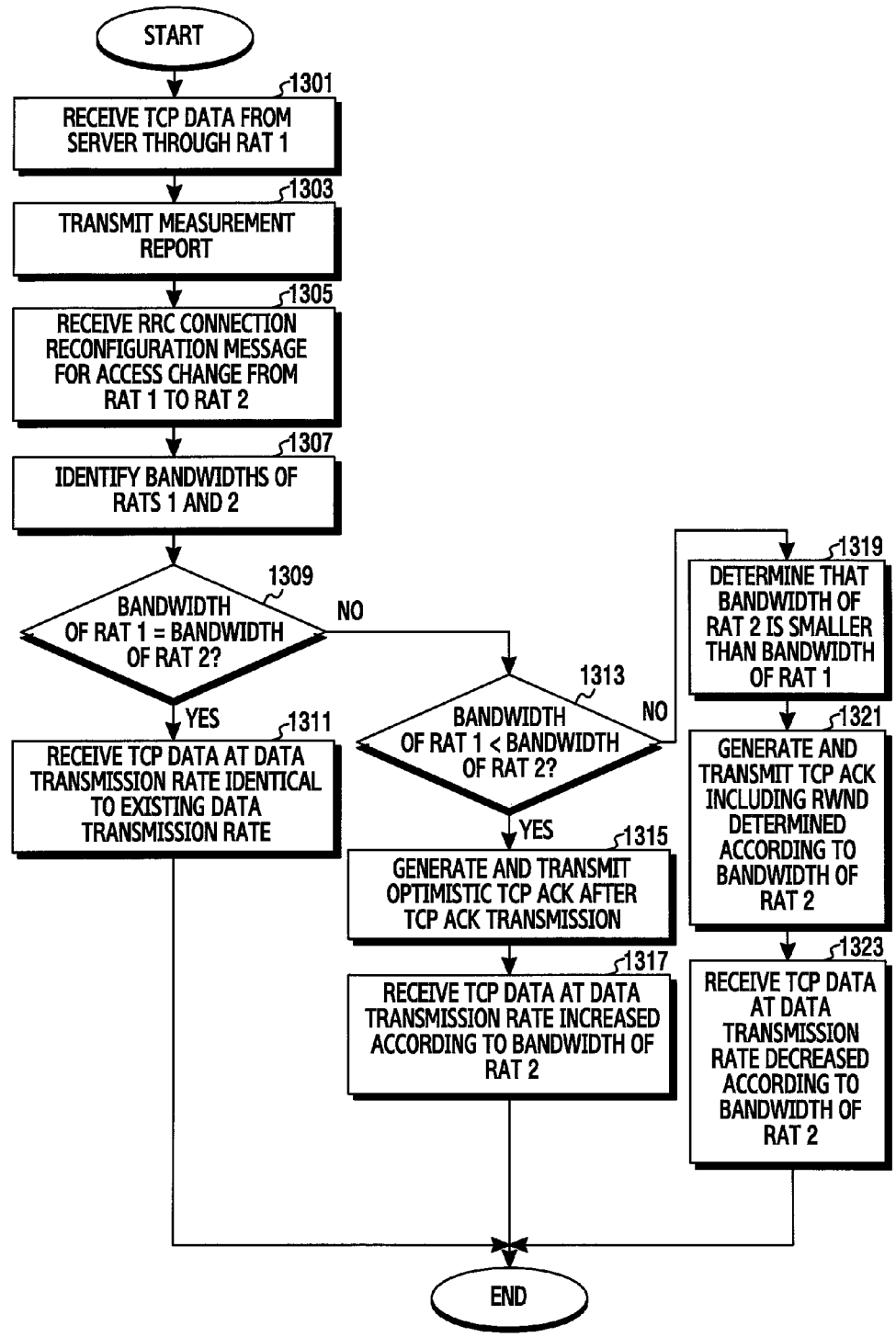
FIG. 13 illustrates a process of receiving TCP data by a user equipment according to an embodiment of the present disclosure.

FIG. 13 illustrates a process of receiving TCP data by a UE according to an embodiment of the present disclosure. Further, for a brief description of the present disclosure, it is assumed that the UE 110 changes access from the eNB1 120 to the eNB2 130 while communicating with the server 100 according to a TCP. Further, it is assumed that the eNB1 120 uses an RAT1 and the eNB2 130 uses an RAT2.

Referring to FIG. 13, in step 1301, the controller 401 of the UE 110 may receive a TCP data segment from the server 100 through the eNB1 120. In step 1303, the controller 401 may transmit a measurement report to the eNB1 120. For example, the measurement report may include signal intensity information related to at least one neighboring eNB.

In step 1305, the controller 401 may receive an RRC connection reconfiguration message for an access change from the eNB1 120 to the eNB2 130. For example, the RRC connection reconfiguration message may be a message which instructs the UE 110 to be connected with the eNB2 130. According to another example, the RRC connection reconfiguration message may include information on the bandwidth of the RAT2 related to the eNB2 130.

In step 1307, the controller 401 may identify the bandwidths of the RAT1 and the RAT2. The bandwidth of the RAT1 is an RAT of the eNB1 120 to which the UE 110 is being connected, and the UE 110 may thus have information on the bandwidth of the RAT1, predetermined therein. Therefore, the controller 401 may identify the bandwidth of the RAT1 on the basis of the stored information on the bandwidth of the RAT1. If the RRC connection reconfiguration message includes information on the bandwidth of the RAT2 related to the eNB2 130, the controller 401 may identify the bandwidth of the RAT2 on the basis of the information on the bandwidth of the RAT2.

If the RRC connection reconfiguration message does not include information on the bandwidth of the RAT2, the controller 401 may directly receive the information on the bandwidth of the RAT2 from a node using the RAT2. For example, when the node is an AP, the controller 401 may receive, from the AP 130, an ADDTS response frame, a beacon frame, or an ANQP response message. As another example, when the ANDSF server 700 is included in a communication system, the controller 401 may receive statistical information from the ANDSF server 700. For example, the statistical information may include bandwidth related information related to at least one eNB or node.

The controller 401 may acquire information on the bandwidth of the RAT2 by using the above-described scheme and estimate the bandwidth of the RAT2 on the basis of the acquired information on the bandwidth of the RAT2.

In step 1309, the controller 401 may compare the bandwidth of the RAT1 with the bandwidth of the RAT2. As a result of the comparison, when the bandwidth of the RAT1 is identical to the bandwidth of the RAT2, the controller 401 may proceed to step 1311. Otherwise, the controller 401 may proceed to step 1313.

If the controller 401 proceeds to step 1311, the controller 401 may receive TCP data at the same data transmission rate as an existing data transmission rate. If the controller 401 proceeds to step 1313, the controller 401 may identify whether the bandwidth of the RAT2 exceeds the bandwidth of the RAT1. As a result of the identifying of whether the bandwidth of the RAT2 exceeds the bandwidth of the RAT1, if the bandwidth of the RAT2 exceeds the bandwidth of the RAT1, the controller 401 may proceed to step 1315. Otherwise, the controller 401 may proceed to step 1319.

If the controller 401 proceeds to step 1315, the controller 401 may generate and transmit a TCP ACK segment corresponding to a TCP data segment received from the server 100, and may generate an optimistic TCP ACK segment and transmit the generated optimistic TCP ACK segment to server 100. For example, the controller 401 may generate an optimistic TCP ACK segment according to the scheme of increasing a TCP data transmission rate, described in FIG. 5. Herein, the optimistic TCP ACK segment is a TCP ACK segment which the controller 401 transmits before receiving a TCP data segment, optimistically assuming that the corresponding TCP data segment is successfully received.

The server 100 may receive an optimistic TCP ACK segment as soon as the server 100 transmits a TCP data segment. Therefore, the server 100 may increase the size of a CWND on the basis of the optimistic TCP ACK segment. Further, the server 100 may transmit the following TCP data segment according to the increased size of the CWND. Through the above-described operations, the server 100 may increase a TCP data transmission rate in accordance with the increase of the RAT2 bandwidth of the UE 110, thereby transmitting TCP data at a transmission rate suitable for the RAT2 bandwidth.

Therefore, in step 1317, the controller 401 may receive TCP data at a data transmission rate increased according to the RAT2 bandwidth.

If the controller 401 proceeds to step 1319, the controller 401 may determine that the bandwidth of the RAT2 is narrower than the bandwidth of the RAT1. In step 1321, the controller 401 may receive a TCP data segment from the server 100, generate a TCP ACK segment including an RWND determined according to the bandwidth of the RAT2, and transmit the generated TCP ACK segment to the server 100. For example, the controller 401 may determine the size of an RWND by using Equation 1. For example, the determined RWND may be included in a window field of the TCP ACK segment.

The server 100 may receive a TCP ACK segment corresponding to a TCP data segment and determine the size of a CWND smaller than a previous size of the CWND on the basis of an RWND included in the received TCP ACK segment. Further, the server 100 may transmit the following TCP data segment according to the determined size of the CWND. Through the above-described operation, the server 100 may decrease a TCP data transmission rate in accordance with the decrease of the RAT2 bandwidth of the UE 110, thereby transmitting TCP data at a transmission rate suitable for the RAT2 bandwidth.

Therefore, in step 1323, the controller 401 may receive TCP data at a data transmission rate decreased according to the RAT2 bandwidth.

Figure 14:
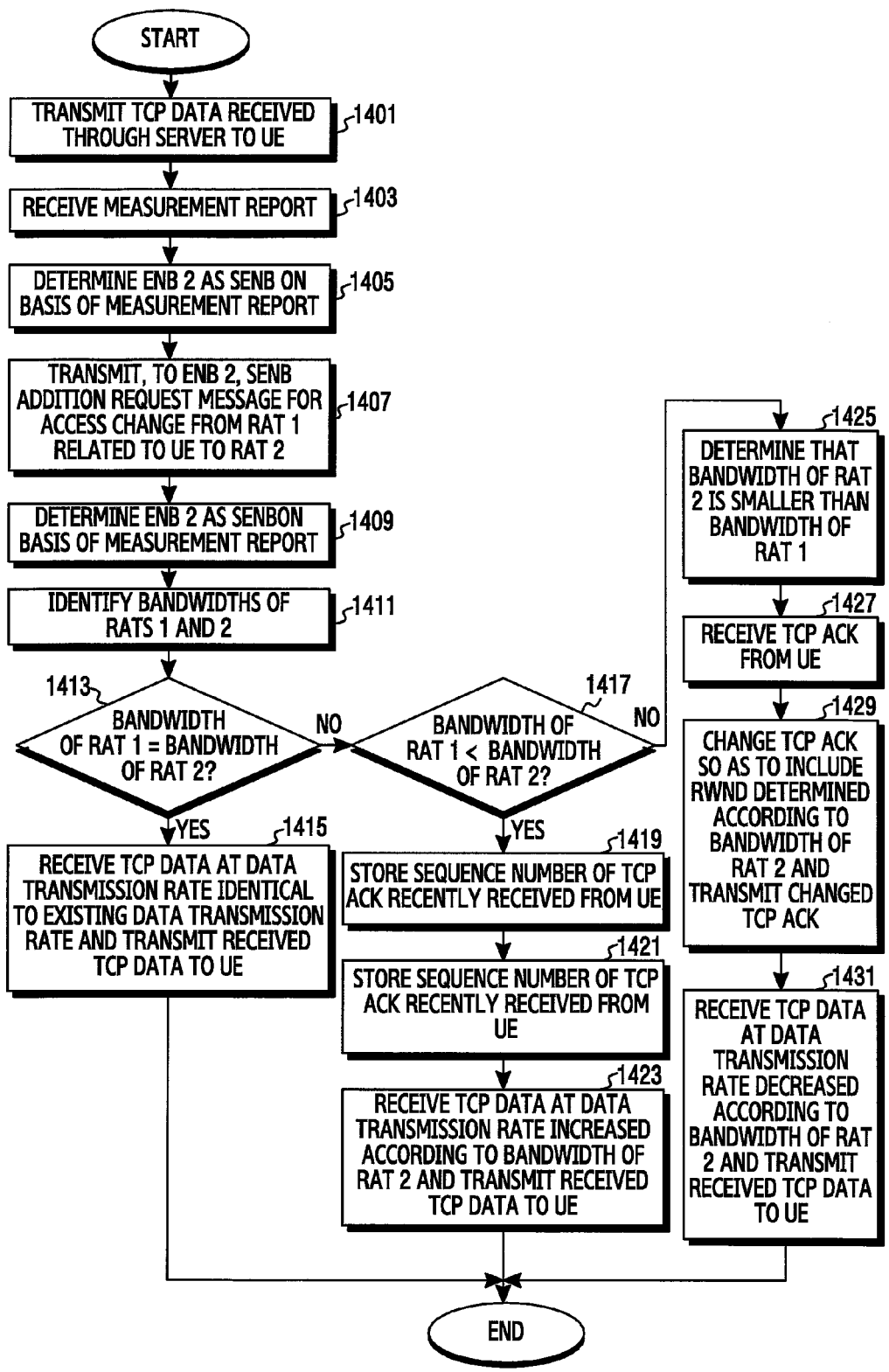
FIG. 14 illustrates a process of receiving TCP data by an eNB according to a first embodiment of the present disclosure.

FIG. 14 illustrates a process of receiving TCP data by an eNB according to a first embodiment of the present disclosure. Further, for a brief description of the present disclosure, it is assumed that the UE 110 changes access from the eNB1 120 to the eNB2 130 while communicating with the server 100 according to a TCP. Further, it is assumed that the eNB1 120 uses an RAT1 and the eNB2 130 uses an RAT2.

In step 1401, the controller 301 of the eNB1 120 may transmit, to the UE 110, a TCP data segment received from the server 100. In step 1403, the controller 301 may receive a measurement report from the UE 110. Herein, the measurement report may include signal intensity information related to at least one neighboring RAT.

In step 1405, the controller 301 may determine to add, as an SeNB, one of one or more RATs adjacent to the UE 110, on the basis of the received measurement report. For example, the controller 301 may determine the eNB2 130 as an SeNB.

In step 1407, the controller 301 may transmit an SeNB addition request message to the eNB2 130 determined as an SeNB. In step 1409, the controller 301 may receive an SeNB addition request ACK message from the eNB2 130 in response to the SeNB addition request message. For example, the SeNB addition request ACK message may include identifier information of the UE 110, information indicating whether to receive data traffic capacity which is being used by the UE 110, and a parameter required when the UE 110 accesses the second RAT. For example, the parameter may include information on the bandwidth of the RAT2.

In step 1411, the controller 301 may identify the bandwidths of the RAT1 and the RAT2. The bandwidth of the RAT1 is the bandwidth of the eNB1 120 itself, and thus RAT1 bandwidth-related information may be pre-stored in the memory 307. For example, the controller 301 may identify the bandwidth of the RAT1 on the basis of the RAT1 bandwidth-related information.

If the SeNB addition request ACK message includes RAT2 bandwidth-related information, the controller 301 may identify the bandwidth of the RAT2 on the basis of the RAT2 bandwidth-related information. If the SeNB addition request ACK message does not include RAT2 bandwidth-related information, the controller 301 may communicate with the eNB2 130 through the second communication unit 305, thereby directly receiving the RAT2 bandwidth-related information.

In step 1413, the controller 301 may compare the bandwidth of the RAT1 with the bandwidth of the RAT2. As a result of the comparison, if the bandwidth of the RAT1 is identical to the bandwidth of the RAT2, the controller 301 may proceed to step 1415. Otherwise, the controller 301 may proceed to step 1417.

If the controller 301 proceeds to step 1415, the controller 301 may receive TCP data at the same data transmission rate as an existing data transmission rate and transmit the received TCP data to the UE 110. If the controller 301 proceeds to step 1417, the controller 301 may identify whether the bandwidth of the RAT2 exceeds the bandwidth of the RAT1. As a result of the identifying of whether the bandwidth of the RAT2 exceeds the bandwidth of the RAT1, if the bandwidth of the RAT2 exceeds the bandwidth of the RAT1, the controller 301 may proceed to step 1419. Otherwise, the controller 301 may proceed to step 1425.

If the controller 301 proceeds to step 1419, the controller 301 may detect a sequence number from a TCP ACK segment recently received from the UE 110 and store the detected sequence number. Thereafter, the controller 301 may transmit the received TCP ACK segment to the server 100. In step 1421, the controller 301 may generate an optimistic TCP ACK segment on the basis of the stored sequence number and transmit the generated optimistic TCP ACK segment to the server 100. For example, the controller 301 may generate an optimistic TCP ACK segment according to the scheme of increasing a TCP data transmission rate, described in FIG. 5. Herein, the optimistic TCP ACK segment is a TCP ACK segment which the controller 301 transmits before the UE 110 receives a TCP data segment, optimistically assuming that the corresponding TCP data segment is successfully received.

After transmitting a TCP data segment, the server 100 may receive an optimistic TCP ACK segment corresponding to the TCP data segment after passage of a time interval shorter than a previous time interval. As described above, the server 100 may increase the size of a CWND as the server 100 receives the optimistic TCP ACK segment. Further, the server 100 may transmit the following TCP data segment according to the increased size of the CWND. Through the above-described operations, the server 100 may increase a TCP data transmission rate in accordance with the increase of the RAT2 bandwidth of the UE 110, thereby transmitting TCP data at a transmission rate suitable for the RAT2 bandwidth.

Therefore, in step 1423, the controller 301 may receive TCP data at a data transmission rate increased according to the RAT2 bandwidth and transmit the received TCP data to the UE 110.

If the controller 301 proceeds to step 1425, the controller 301 may determine that the bandwidth of the RAT2 is narrower than the bandwidth of the RAT1. In step 1327, the controller 301 may receive a TCP ACK segment from the UE 110. In step 1329, the controller 301 may change the received TCP ACK segment so that the received TCP ACK segment includes an RWND determined according to the bandwidth of the RAT2 and may transmit the changed TCP ACK segment to the server 100. For example, the controller 301 may determine the size of an RWND by using Equation 1. For example, the determined RWND may be included in a window field of the TCP ACK segment.

The server 100 may receive a TCP ACK segment corresponding to a TCP data segment and determine the size of a CWND smaller than a previous size of the CWND on the basis of an RWND included in the received TCP ACK segment. Further, the server 100 may transmit the following TCP data segment according to the determined size of the CWND. Through the above-described operations, the server 100 may decrease a TCP data transmission rate in accordance with the decrease of the RAT2 bandwidth of the UE 110, thereby transmitting TCP data at a transmission rate suitable for the RAT2 bandwidth.

Therefore, in step 1431, the controller 301 may receive TCP data at a data transmission rate decreased according to the RAT2 bandwidth and transmit the received TCP data to the UE 110.

Figure 15:
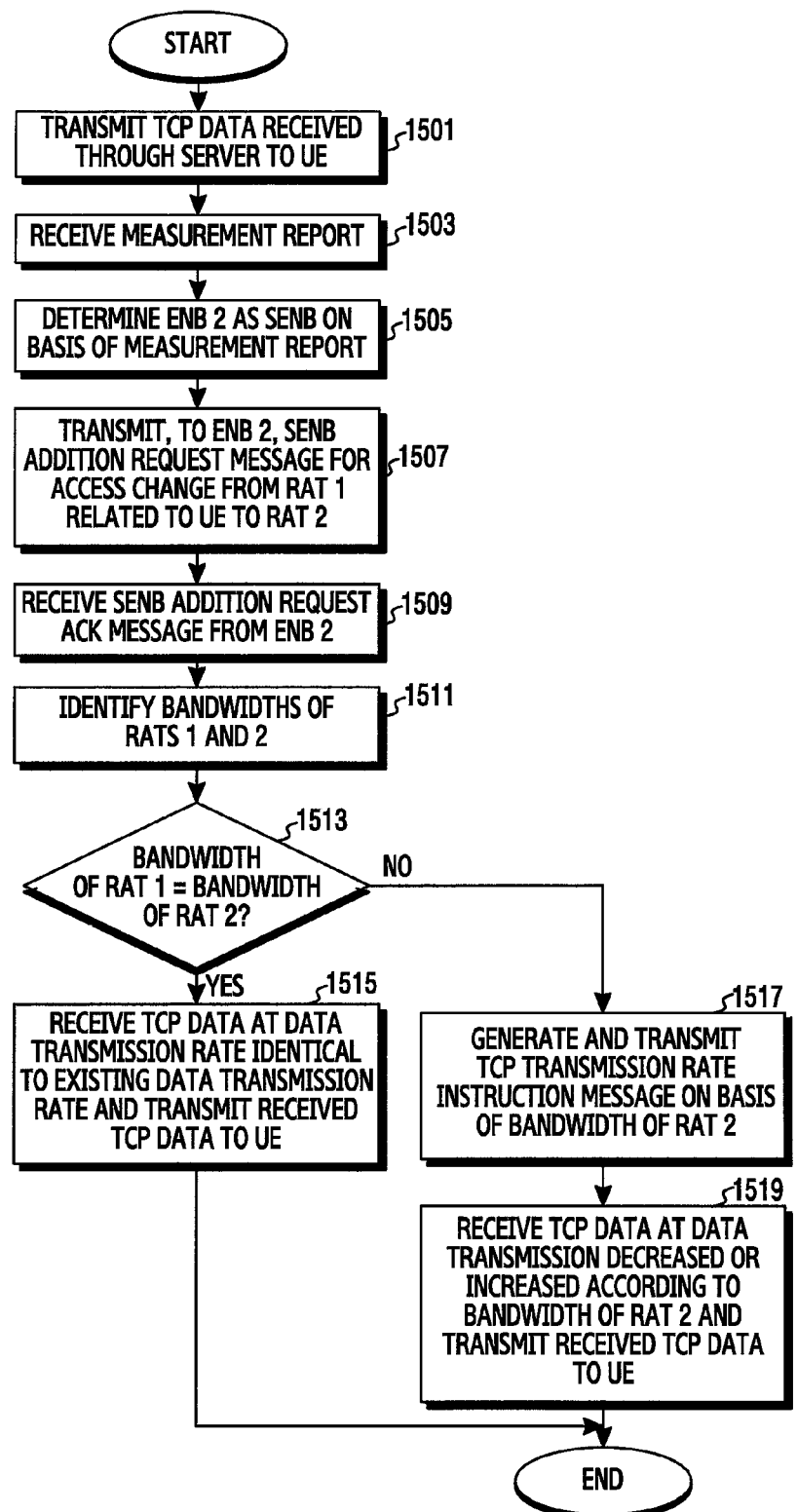
FIG. 15 illustrates a process of receiving TCP data by an eNB according to a second embodiment of the present disclosure.

FIG. 15 illustrates a process of receiving TCP data by an eNB according to a second embodiment of the present disclosure. Further, for a brief description of the present disclosure, it is assumed that the UE 110 changes access from the eNB1 120 to the eNB2 130 while communicating with the server 100 according to a TCP. Further, it is assumed that the eNB1 120 uses an RAT1 and the eNB2 130 uses an RAT2.

In FIG. 15, steps 1501 to 1515 correspond to steps 1401 to 1415 in FIG. 14, respectively. Therefore, a description will be omitted of steps 1501 to 1515 and will be made from step 1517.

In step 1517, the controller 301 of the eNB1 120 may generate a TCP transmission rate instruction message on the basis of the bandwidth of the RAT2 identified in step 1509 and transmit the generated TCP transmission rate instruction message to the TCP proxy server 900 or 1200. For example, the TCP transmission rate instruction message may be a message which instructs the server 100 to control the transmission rate of TCP data. For example, the TCP transmission rate instruction message may include RAT2 bandwidth information or TCP data transmission rate information (e.g. 100 Mbps) which the UE 110 wants. For example, the controller 301 may transmit a TCP transmission rate instruction message through an out-of-band signal.

The TCP proxy server 900 or 1200 may receive the TCP transmission rate instruction message and detect, from the received TCP transmission rate instruction message, the RAT2 bandwidth information or the TCP data transmission rate information which the UE 110 wants. Further, the TCP proxy server 900 or 1200 may increase or decrease the size of a CWND of the server 100 according to the RAT2 bandwidth information or the TCP data transmission rate information which the UE 110 wants. Further, the server 100 may transmit the following TCP data segment according to the increased or decreased CWND. Through the above-described operations, the server 100 may increase or decrease a TCP data transmission rate in accordance with the increase or decrease of the RAT2 bandwidth of the UE 110, thereby transmitting TCP data at a transmission rate suitable for the bandwidth of the RAT2.

Therefore, in step 1519, the controller 301 may receive TCP data at a data transmission rate increased or decreased according to the bandwidth of the RAT2 and transmit the received TCP data to the UE 110.

Figure 16:
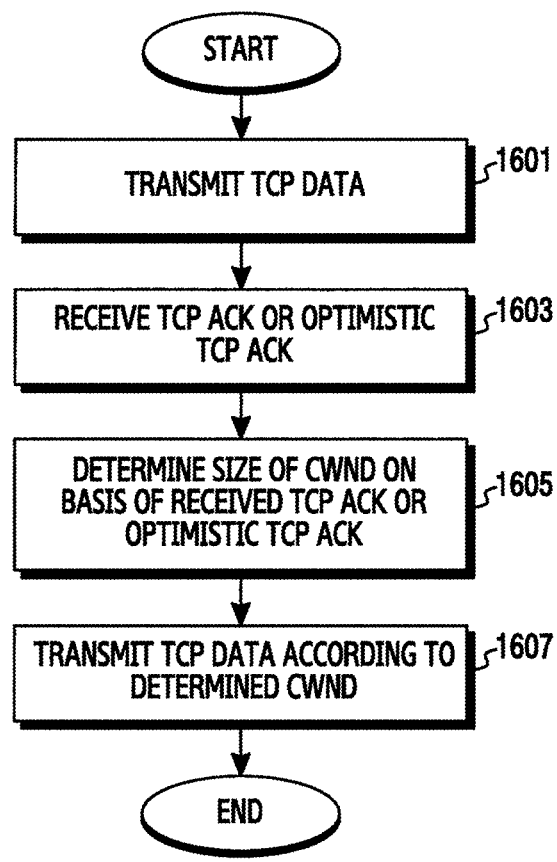
FIG. 16 illustrates a process of transmitting TCP data by a server according to an embodiment of the present disclosure.

FIG. 16 illustrates a process of transmitting TCP data by a server according to an embodiment of the present disclosure.

Referring to FIG. 16, in step 1601, the controller 601 of the server 100 transmits a TCP data segment to the UE 110. In step 1603, the controller 601 receives a TCP ACK segment or an optimistic TCP ACK segment. For example, the TCP ACK segment may be a response message related to the TCP data segment transmitted in step 1601. For example, the TCP ACK segment may include an RWND indicating the amount of data which can be received by the UE 110. For example, the optimistic TCP ACK segment may be a TCP ACK segment which the UE 110 transmits before receiving a TCP data segment, optimistically assuming that the corresponding TCP data segment is successfully received.

In step 1605, the controller 601 may determine the size of a CWND on the basis of the received TCP ACK segment or optimistic TCP ACK segment. For example, the controller 601 may analyze the received TCP ACK segment so as to detect an RWND and may decrease the size of a CWND on the basis of the detected RWND. As another example, the controller 601 may calculate an RTT on the basis of a transmission time point of the TCP data segment and a reception time point of the optimistic TCP ACK segment and may increase the size of a CWND on the basis of the calculated RTT.

In step 1607, the controller 601 may transmit TCP data according to the determined CWND. For example, the controller 601 may decrease a transmission rate according to the decreased CWND and then transmit TCP data at the decreased transmission rate. As another example, the controller 601 may increase a transmission rate according to the increased size of a CWND and then transmit TCP data at the increased transmission rate.

Figure 17:
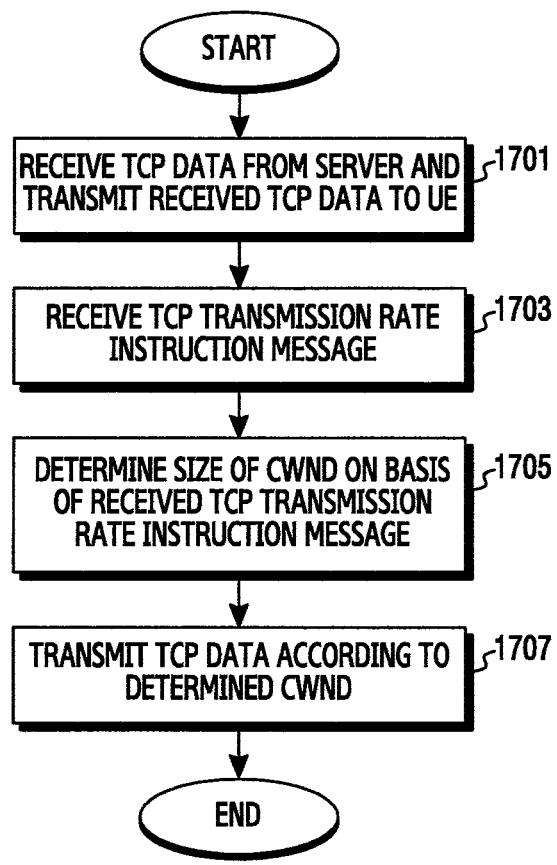
FIG. 17 illustrates a process of transmitting TCP data by a TCP proxy server according to an embodiment of the present disclosure.

FIG. 17 illustrates a process of transmitting TCP data by a TCP proxy server according to an embodiment of the present disclosure. According to an embodiment, the TCP proxy server 900 or 1200 may have the same block diagram as that of the server 100.

Referring to FIG. 17, in step 1701, the controller 601 of the TCP proxy server 900 or 1200 may receive a TCP data segment from the server 100 and transmit the received TCP data segment to the UE 110. In step 1703, the controller 601 may receive a TCP transmission rate instruction message from the eNB1 120. For example, the TCP transmission rate instruction message may include information on the bandwidth of an RAT (e.g. RAT1 or RAT2) into which the UE 110 is expected to perform or has performed an access change. For example, the information on the bandwidth of the RAT may include the bandwidth of the corresponding RAT or a data transmission rate which the UE 110 wants.

In step 1705, the controller 601 may determine the size of a CWND on the basis of the received TCP transmission rate instruction message. For example, the controller 601 may increase or decrease the size of the CWND of the server 100 on the basis of RAT bandwidth information included in the TCP transmission rate instruction message. In step 1707, the controller 601 may transmit a TCP data segment to the UE 110 according to the determined CWND. For example, the controller 601 may receive a TCP data segment from the server 100 at a transmission rate according to the determined CWND and transmit the received TCP data segment to the UE 110.

According to the present disclosure, it has been described that a message (e.g. an optimistic TCP ACK segment, a TCP ACK segment including an RWND, or a TCP transmission rate instruction message) is generated on the basis of a comparison between the bandwidth of the RAT1 and the bandwidth of the RAT2. However, the message may be generated on the basis of a change amount between the bandwidth of the RAT1 and the bandwidth of the RAT2.

For example, if the bandwidth of the RAT2 is a pre-designated number of times (e.g. ten times) larger than the bandwidth of the RAT1 when a user equipment changes access from the RA1 to the RAT2, an eNB or the user equipment may generate an optimistic TCP ACK message. As another example, if the bandwidth of the RAT2 is a pre-designated number of times (e.g. ten times) smaller than the bandwidth of the RAT1, an eNB1 corresponding to the RAT1 or a user equipment may generate a TCP ACK message including an RWND. As another example, if the bandwidth of the RAT2 is a pre-designated number of times (e.g. ten times) larger or smaller than the bandwidth of the RAT1, the eNB1 corresponding to the RAT1 may generate a TCP transmission rate instruction message.

The "module" used in various embodiments of the present disclosure may refer to, for example, a "unit" including one of hardware, software, and firmware, or a combination of two or more of the hardware, software, and firmware. The "module" may be interchangeable with a term, such as a unit, a logic, a logical block, a component, or a circuit. The "module" may be a minimum unit of an integrated component element or a part thereof. The "module" may be a minimum unit for performing one or more functions or a part thereof. The "module" may be mechanically or electronically implemented. For example, the "module" according to various embodiments of the present disclosure may include at least one of an application-specific integrated circuit (ASIC) chip, a field-programmable gate array (FPGA), and a programmable-logic device for performing certain operations.

Methods stated in claims and/or specifications according to various embodiments may be implemented by hardware, software, or a combination of hardware and software.

In the implementation of software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the present disclosure as defined by the appended claims and/or disclosed herein.

The programs (software modules or software) may be stored in non-volatile memories including a random access memory and a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs), or other type optical storage devices, or a magnetic cassette. Alternatively, any combination of some or all of the may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the present disclosure, a component included in the present disclosure is expressed in the singular or the plural according to a presented detailed embodiment. However, the singular form or plural form is selected for convenience of description suitable for the presented situation, and various embodiments of the present disclosure are not limited to a single element or multiple elements thereof. Further, either multiple elements expressed in the description may be configured into a single element or a single element in the description may be configured into multiple elements.

Although the present disclosure has been described with embodiments, various changes and modifications may be suggested to one skilled in the art. It is intended that the present disclosure encompass such changes and modifications as fall within the scope of the appended claims.

What is claimed is:

1. A method for operating an apparatus for receiving a data regarding a transmission control protocol (TCP) in a wireless communication system, the method comprising:

identifying an access node for the apparatus having been changed from a first node using a first radio access technology (RAT) to a second node using a second RAT;

identifying a first bandwidth regarding the first RAT and a second bandwidth regarding the second RAT;

generating a TCP acknowledgment (ACK) message based on another TCP ACK message that has been lastly transmitted to another apparatus;

transmitting, to the other apparatus, the TCP ACK message before a TCP data is received if the second bandwidth exceeds the first bandwidth; and receiving the TCP data according to a congestion window with a size increased by the other apparatus based on the TCP ACK message.

2. The method of claim 1, wherein the TCP ACK message includes information for notifying the other apparatus that the second bandwidth exceeds the first bandwidth.

3. The method of claim 1, wherein generating the TCP ACK message comprises generating the TCP ACK message based on at least one of a sequence number of another TCP data which has been lastly received and a sequence number of the other TCP ACK message which has been lastly transmitted.

4. The method of claim 3, generating the TCP ACK message comprises:
generating the TCP ACK message by adding a predetermined threshold value to at least one of the sequence number of the other TCP data and the sequence number of the other TCP ACK message.

5. The method of claim 1, further comprising transmitting the TCP ACK message after the TCP data is received if the second bandwidth does not exceed the first bandwidth.

6. The method of claim 1, wherein an amount of the TCP data corresponds to the size of the congestion window.

7. A method for operating an apparatus for transmitting a data regarding a transmission control protocol (TCP) in a wireless communication system, the method comprising:
receiving a TCP ACK message from another apparatus with an access node for the other apparatus having been changed from a first node using a first radio access technology (RAT) to a second node using the second RAT;
determining whether the TCP ACK message is transmitted before the other apparatus has received a TCP data;
increasing a size of a congestion window based on determining that the TCP ACK message is transmitted before the other apparatus has received the TCP data; and
transmitting the TCP data to the other apparatus through the congestion window with the increased size.

8. The method of claim 7, wherein the increasing of the congestion window comprises:
determining the size of the congestion window based on a round trip time (RTT) between the TCP ACK message and the TCP data in comparison to a reference value.

9. An apparatus for receiving a data regarding transmission control protocol (TCP) in a wireless communication system, the apparatus comprising:
at least one transceiver; and
at least one processor operatively coupled to the at least one transceiver,
wherein the at least one processor is configured to:
identify an access node for the apparatus having been changed from a first node using a first radio access technology (RAT) to a second node using a second RAT;
identify a first bandwidth regarding the first RAT and a second bandwidth regarding the second RAT;
generate a TCP ACK message based on another TCP ACK message which has been lastly transmitted to another apparatus;
transmit, to the other apparatus, the TCP ACK message before a TCP data is received if the second bandwidth exceeds the first bandwidth; and
receive the TCP data according to a congestion window with a size increased by the other apparatus based on the TCP ACK message.

10. The apparatus of claim 9, wherein the TCP ACK message includes information for notifying the other apparatus that the second bandwidth exceeds the first bandwidth.

11. The apparatus of claim 9, wherein the at least one processor is configured to generate the TCP ACK message based on at least one of a sequence number of another TCP data which has been lastly received and a sequence number of the other TCP ACK message which has been lastly transmitted.

12. The apparatus of claim 11, wherein the at least one processor is configured to generate the TCP ACK message by adding a predetermined threshold value to at least one of the sequence number of the other TCP data and the sequence number of the other TCP ACK message.

13. The apparatus of claim 9, wherein the at least one processor is configured to:
transmit the TCP ACK message after the TCP data is receive if the second bandwidth does not exceed the first bandwidth.

14. The apparatus of claim 9, wherein an amount of the TCP data corresponds to the size of the congestion window.

15. The apparatus of claim 14,
wherein the size of the congestion window is determined based on a round trip time (RTT) between the TCP ACK message and the TCP data in comparison to a reference value.

16. The apparatus of claim 13,
wherein the TCP ACK message comprises information for notifying the other apparatus that the second bandwidth exceeds the first bandwidth.

* * * * *